US012614939B2

(12) United States Patent
Suzuki

(10) Patent No.: US 12,614,939 B2
(45) Date of Patent: Apr. 28, 2026

(54) PERMANENT MAGNET EMBEDDED MOTOR AND PUMP DEVICE

(71) Applicant: MIKUNI CORPORATION, Tokyo (JP)

(72) Inventor: Shin Suzuki, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 18/749,603

(22) Filed: Jun. 20, 2024

(65) Prior Publication Data

US 2025/0096629 A1     Mar. 20, 2025

(30) Foreign Application Priority Data

Sep. 20, 2023     (JP) .................................. 2023-151917

(51) Int. Cl.
| *H02K 1/28* | (2006.01) |
| *F04C 2/10* | (2006.01) |
| *H02K 1/276* | (2022.01) |
| *H02K 21/16* | (2006.01) |

(52) U.S. Cl.
CPC ................. *H02K 1/28* (2013.01); *F04C 2/10* (2013.01); *H02K 1/276* (2013.01); *H02K 21/16* (2013.01); *F04C 2240/40* (2013.01)

(58) Field of Classification Search
CPC ....... F04C 2/10; F04C 2240/40; H02K 15/03; H02K 1/28; H02K 1/276
See application file for complete search history.

(56) References Cited

FOREIGN PATENT DOCUMENTS

| JP | 2022116563 | | 8/2022 | |
| JP | 2022116563 A | * | 8/2022 | ............. H02K 21/16 |

OTHER PUBLICATIONS

JP-2022116563-A English Translation (Year: 2022).*

* cited by examiner

*Primary Examiner* — Anthony Ayala Delgado
(74) *Attorney, Agent, or Firm* — JCIPRNET

(57)     ABSTRACT

A permanent magnet embedded motor includes: a stator of an annular shape; a rotor, arranged inside the stator, including a rotor core and a permanent magnet, and rotating about a predetermined axis. The rotor core includes an insertion hole arranged in a circumferential direction and a filling part provided adjacent to the insertion hole for filling with an adhesive. The permanent magnet is inserted into the insertion hole. The insertion hole includes a wall surface to which the permanent magnet adheres. At one opening end of the insertion hole, the filling part is of a shape obtained by cutout in a stepped-down manner in an inner edge area of the insertion hole corresponding to the wall surface.

13 Claims, 19 Drawing Sheets

PERMANENT MAGNET EMBEDDED MOTOR AND PUMP DEVICE

CROSS-REFERENCE TO RELATED APPLICATIONS

This application claims the priority benefit of Japan Application No. 2023-151917, filed on Sep. 20, 2023. The entirety of the above-mentioned patent application is hereby incorporated by reference herein and made a part of this specification.

BACKGROUND

Technical Field

The present disclosure relates to a permanent magnet embedded motor including a stator around which a coil is wound and a rotor in which a permanent magnet is embedded, and to a pump device using the permanent magnet embedded motor as a drive source.

Related Art

As a conventional permanent magnet embedded motor, there has been known a permanent magnet embedded motor including: a stator core of an annular shape, including teeth and slots arranged in a circumferential direction; a coil, wound around the teeth; a rotor core, arranged to face the teeth of a stator, having an insertion hole arranged in the circumferential direction and a filling hole for filling with an adhesive; and a permanent magnet, inserted into the insertion hole. The stator is constituted by the stator core and the coil, and a rotor is constituted by the rotor core and the permanent magnet (see, for example, Japanese Patent Laid-open No. 2022-116563).

In this permanent magnet embedded motor, the filling hole is formed with a small width dimension communicating with a central area of the insertion hole radially inside the insertion hole and with a depth dimension across substantially the entire area of the insertion hole in a depth direction. In the case where the adhesive is filled into the filling hole, the adhesive is present between the rotor core and the permanent magnet only in a range of the width dimension communicating with the central area of the insertion hole, the adhesion area is not sufficient, and a layer of the filled adhesive tends to become thick.

Accordingly, there is room for improvement in a filling method of the adhesive in order to increase adhesive strength of the adhesive and avoid cohesive failure or the like of the adhesive.

SUMMARY

A permanent magnet embedded motor of the present disclosure includes: a stator of an annular shape; and a rotor, arranged inside the stator, including a rotor core and permanent magnets, and rotating about a predetermined axis. The rotor core includes insertion holes arranged in a circumferential direction and filling parts provided adjacent to the insertion holes respectively for filling with an adhesive. Each of the permanent magnets is inserted into the corresponding insertion hole. Each of the insertion holes includes a wall surface to which the permanent magnet adheres. At one opening end of the insertion hole, the corresponding filling part is of a shape obtained by cutout in a stepped-down manner in an inner edge area of the insertion hole corresponding to the wall surface.

DESCRIPTION OF THE EMBODIMENTS

Figure 1:
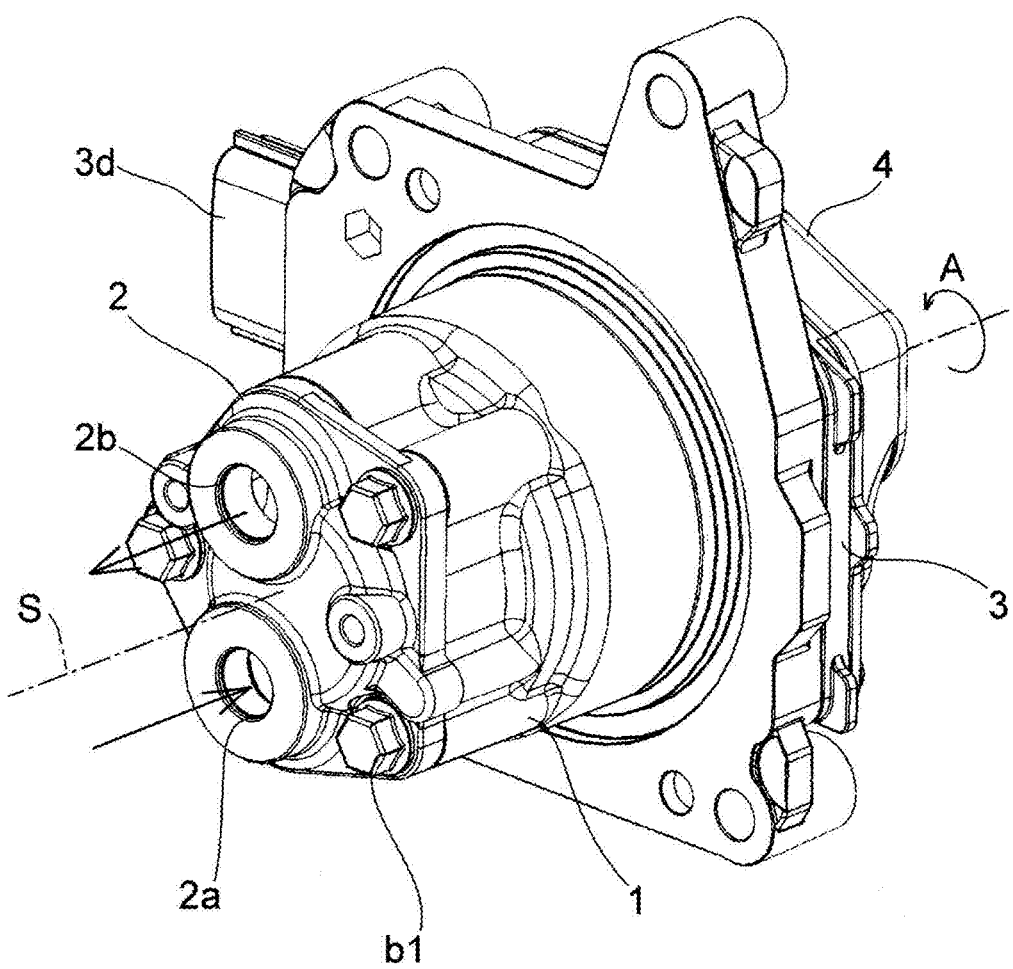
FIG. 1 is an external perspective view illustrating a pump device including a permanent magnet embedded motor according to the present disclosure.

The present disclosure provides a permanent magnet embedded motor in which waste of an adhesive can be eliminated and a permanent magnet can be firmly adhered with a small amount of the adhesive, and provides a pump device using the permanent magnet embedded motor as a drive source.

A permanent magnet embedded motor of the present disclosure includes: a stator of an annular shape; and a rotor, arranged inside the stator, including a rotor core and permanent magnets, and rotating about a predetermined axis. The rotor core includes insertion holes arranged in a circumferential direction and filling parts provided adjacent to the insertion holes respectively for filling with an adhesive. Each of the permanent magnets is inserted into the corresponding insertion hole. Each of the insertion holes includes a wall surface to which the permanent magnet adheres. At one opening end of the insertion hole, the corresponding filling part is of a shape obtained by cutout in a stepped-down manner in an inner edge area of the insertion hole corresponding to the wall surface.

In the above permanent magnet embedded motor, a cross section of the insertion hole perpendicular to the axis may be of a rectangular shape including a long side and a short side. A cross section of the permanent magnet perpendicular to the axis may be of a rectangular flat plate shape including a long side and a short side. The filling part may be of a shape obtained by cutout in a stepped-down manner in an inner edge area along the long side of the insertion hole.

In the above permanent magnet embedded motor, the insertion hole may have a cross-sectional shape long in a vertical direction with respect to a radial direction of the rotor. The permanent magnet may have a cross-sectional shape long in the vertical direction. The filling part may include a bottom surface long in the vertical direction and flat in a direction perpendicular to the axis.

In the above permanent magnet embedded motor, the filling part may be formed adjacent to and radially inside the insertion hole.

In the above permanent magnet embedded motor, $0.05 \leq Gd/RT \leq 0.06$ is satisfied, where $Gd$ denotes a depth dimension of the filling part in a direction of the axis, and $RT$ denotes a thickness dimension of the rotor core in the direction of the axis.

In the above permanent magnet embedded motor, $0.1$ mm $\leq Cf \leq 0.2$ mm is satisfied, where $Mt$ denotes a thickness dimension of the permanent magnet in a direction of the short side, $Ht$ denotes a pore dimension of the insertion hole in the direction of the short side, $Cf$ denotes a gap dimension between the permanent magnet and the insertion hole, and $Cf = Ht - Mt$.

In the above permanent magnet embedded motor, $0.05 \leq Gd/RT \leq 0.06$ and $0.1$ mm $\leq Cf \leq 0.2$ mm are satisfied, where $Gd$ denotes a depth dimension of the filling part in a direction of the axis, $RT$ denotes a thickness dimension of the rotor core in the direction of the axis, $Mt$ denotes a thickness dimension of the permanent magnet in a direction of the short side, $Ht$ denotes a pore dimension of the insertion hole in the direction of the short side, $Cf$ denotes a gap dimension between the permanent magnet and the insertion hole, and $Cf = Ht - Mt$.

In the above permanent magnet embedded motor, the insertion hole may have a cross-sectional shape long in a vertical direction with respect to a radial direction of the rotor. The permanent magnet may have a cross-sectional shape long in the vertical direction. The filling part may include a bottom surface long in the vertical direction and flat in a direction perpendicular to the axis. The rotor core may include a gap continuous with both ends of the insertion hole in the vertical direction.

In the above permanent magnet embedded motor, the rotor core may include an isolation wall that separates the filling part from a wall surface that defines the short side of the insertion hole in the vicinity of both ends of the insertion hole in a direction of the long side.

In the above permanent magnet embedded motor, the rotor core may include a receiving part that contacts and receives the permanent magnet inserted into the insertion hole at the other opening end of the insertion hole.

In the above permanent magnet embedded motor, the adhesive filled in the filling part may be paste-like.

The above permanent magnet embedded motor may further include a housing that fixes the stator and rotatably supports the rotor.

A pump device of the present disclosure includes: a pump unit, suctioning and discharging a fluid; a rotating shaft, connected to the pump unit; and a drive source, exerting a driving force on the rotating shaft. As the drive source, a permanent magnet embedded motor including the above housing and having any one of the above configurations is employed.

In the above pump device, the pump unit may be a trochoid pump including an inner rotor to which the rotating shaft is connected and an outer rotor engaged with the inner rotor.

According to the permanent magnet embedded motor having the above configuration, a permanent magnet embedded motor can be obtained having excellent durability, in which waste of an adhesive that fixes a permanent magnet can be eliminated and the permanent magnet can be firmly adhered with a small amount of the adhesive. By using such a permanent magnet embedded motor as a drive source, a highly reliable pump device can be obtained.

Hereinafter, an embodiment of the present disclosure will be described with reference to the accompanying drawings.

Figure 2:
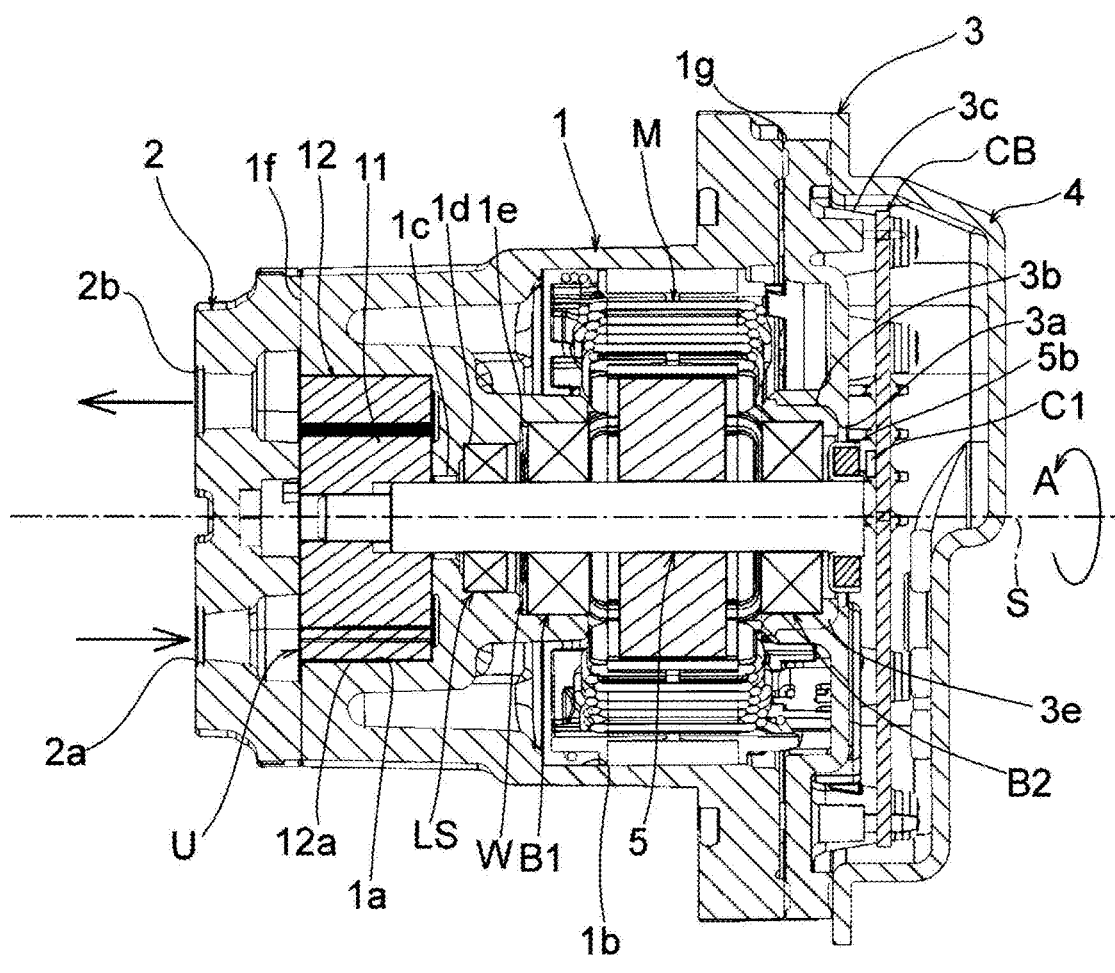
FIG. 2 is a cross-sectional view of the pump device illustrated in FIG. 1.
Figure 3:
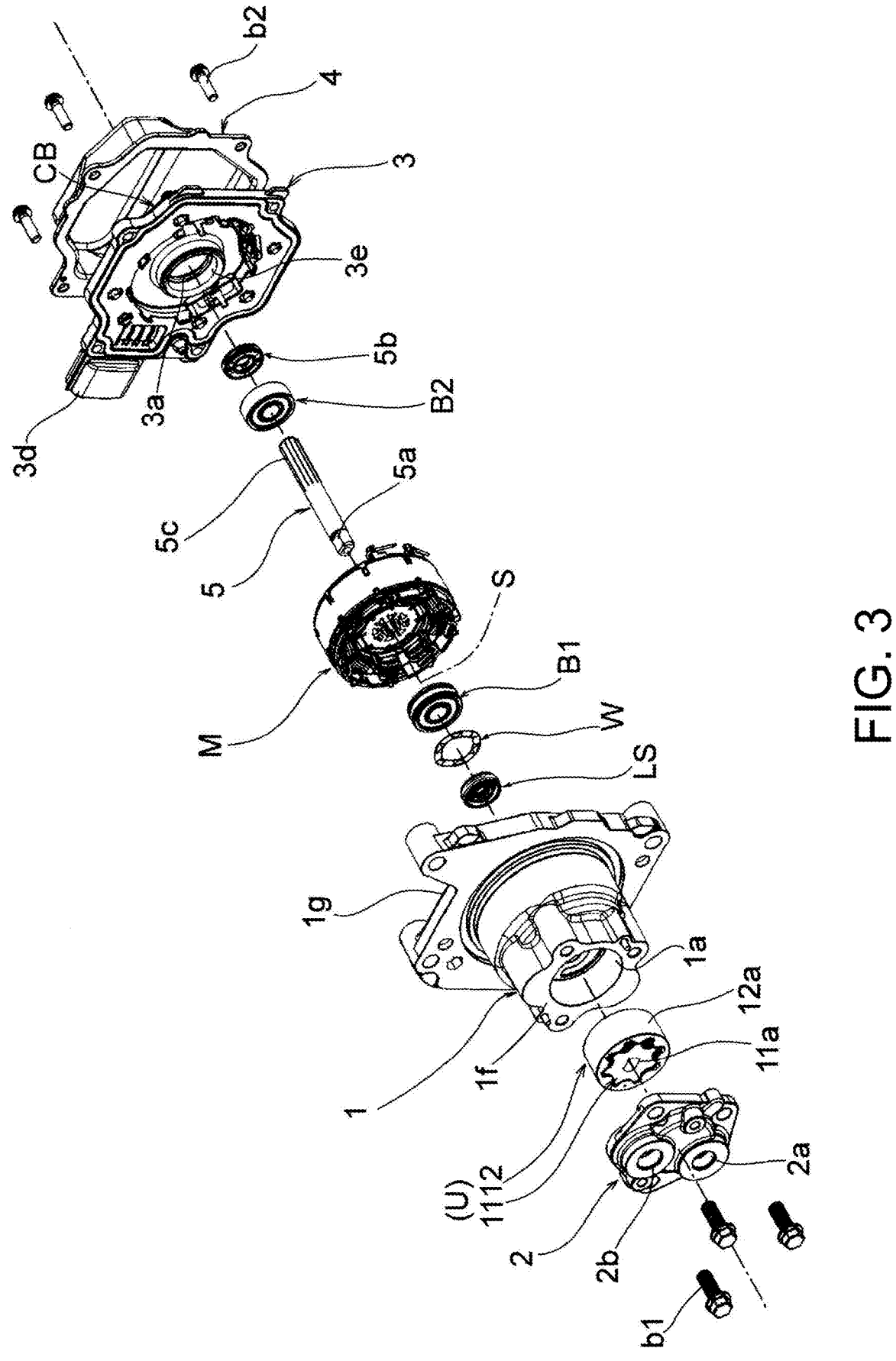
FIG. 3 is an exploded perspective view of the pump device illustrated in FIG. 1.
Figure 4:
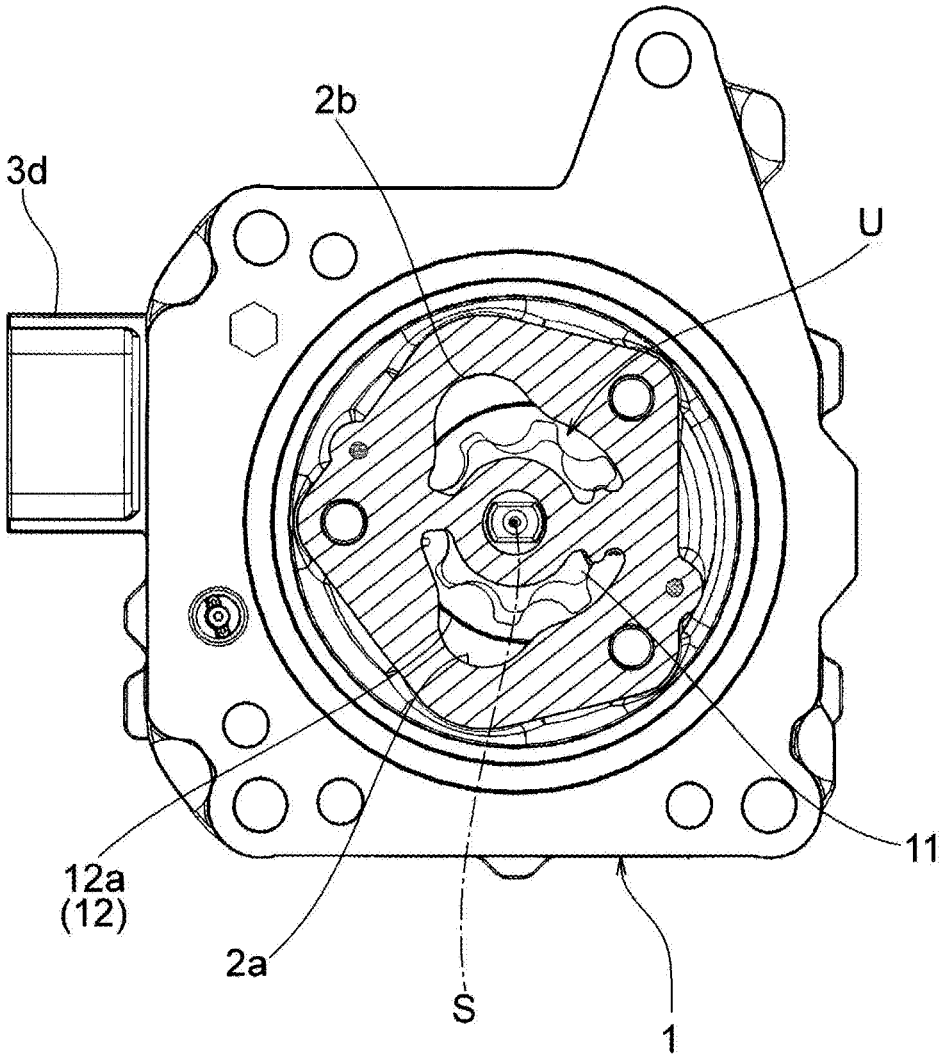
FIG. 4 is a cross-sectional view illustrating a suction port and a discharge port for a fluid in the pump device illustrated in FIG. 1, taken along a plane perpendicular to an axis which is a center line of rotation of a rotor.

As illustrated in FIG. 1 to FIG. 3, a pump device including a permanent magnet embedded motor according to one embodiment includes a housing body 1, a pump cover 2, a motor cover 3, a board cover 4, a rotating shaft 5, a pump unit U, a permanent magnet embedded motor M as a drive source, a circuit board CB, and so on.

The pump unit U is a trochoid pump that suctions and discharges a fluid (here, oil) and includes an inner rotor 11 and an outer rotor 12.

Figure 5:
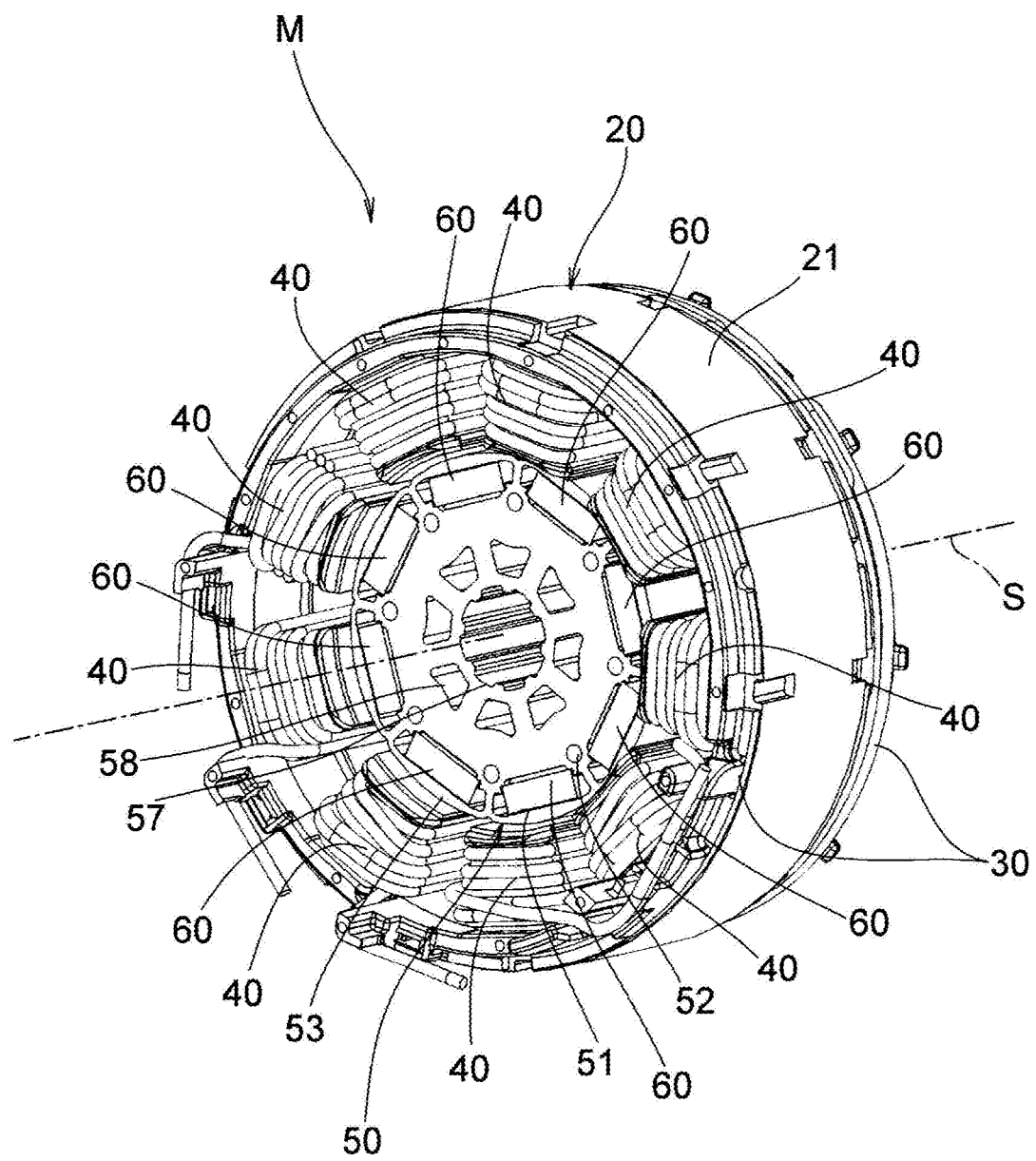
FIG. 5 is an external perspective view illustrating a stator and a rotor of the permanent magnet embedded motor as a drive source included in the pump device illustrated in FIG. 1.
Figure 6:
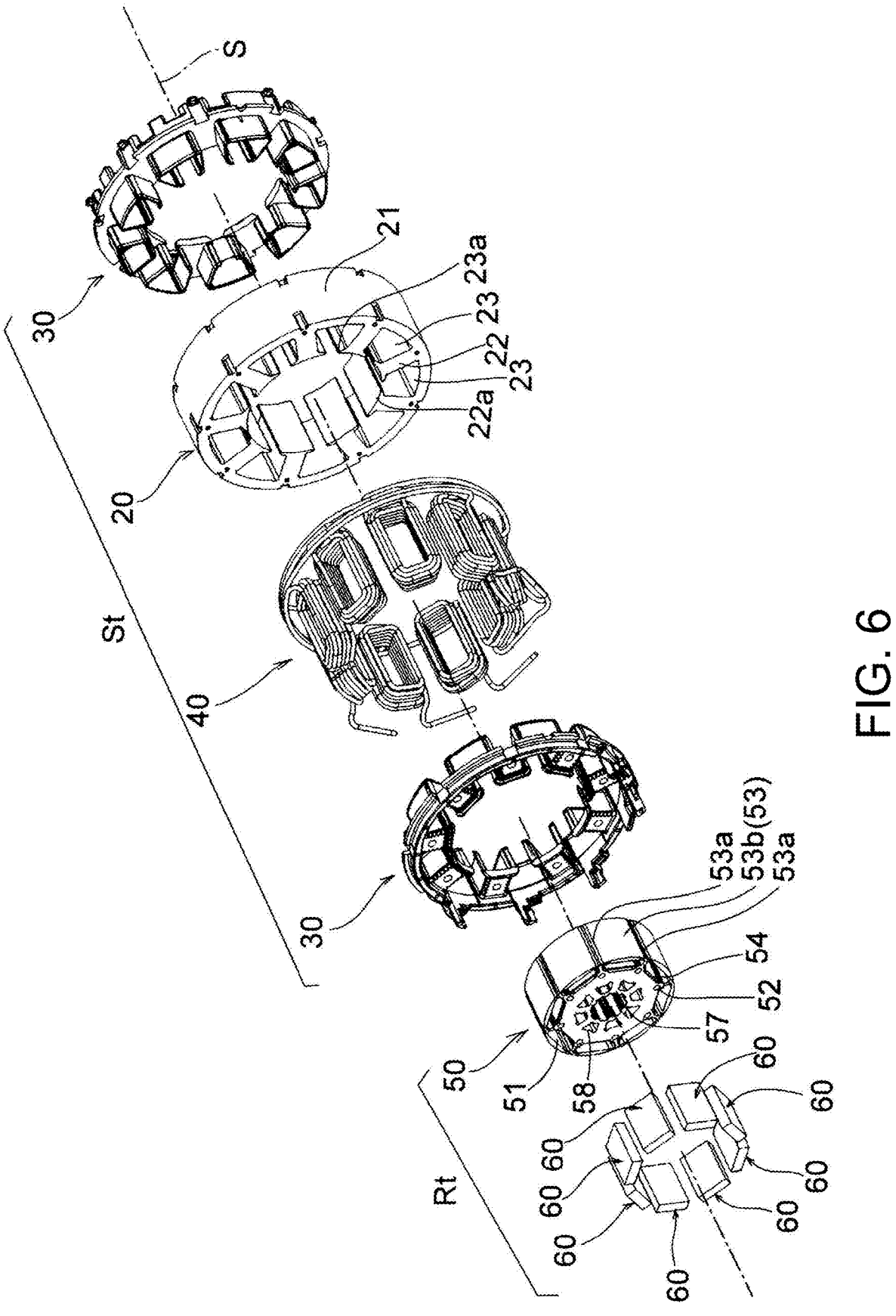
FIG. 6 is an exploded perspective view of the stator and the rotor of the permanent magnet embedded motor illustrated in FIG. 5.

As illustrated in FIG. 2, FIG. 5 and FIG. 6, the permanent magnet embedded motor M includes: a stator St, including a stator core 20, a bobbin 30, and a coil 40; a rotor Rt, including a rotor core 50 and a permanent magnet 60, rotating about an axis S; and a housing (housing body 1, motor cover 3), and is a three-phase brushless motor including nine slots and eight magnetic poles.

Here, the housing body 1 and the motor cover 3, while being portions of the housing of the pump device, function as the housing of the permanent magnet embedded motor M, fix the stator St, and rotatably support the rotor Rt.

The housing body 1 is made of an aluminum material or the like. As illustrated in FIG. 2 and FIG. 3, the housing body 1 includes an accommodation recess 1*a* that accommodates the pump unit U, an accommodation recess 1*b* that allows the stator St to be fitted and accommodated therein, a communication path 1*c* that communicates the accommodation recess 1*a* with the accommodation recess 1*b*, an annular recess 1*d*, an annular recess 1*e*, an end face 1*f*, and an end face 1*g*.

The communication path 1*c* is formed in a cylindrical shape centered on the axis S being a center line of rotation of the rotor Rt, and the rotating shaft 5 is inserted through the communication path 1*c* with a predetermined gap therebetween.

The annular recess 1*d* is formed in an annular shape centered on the axis S in order for a lip type seal LS to be fitted therein.

The annular recess 1*e* is formed in an annular shape centered on the axis S in order for a bearing B1 to be fitted therein, the bearing B1 allowing a washer W to be interposed between itself and the lip type seal LS and rotatably supporting the rotating shaft 5.

The pump cover 2 is made of an aluminum material or the like. As illustrated in FIG. 2 and FIG. 3, the pump cover 2 is joined to the end face 1*f* of the housing body 1 and covers the accommodation recess 1*a*. The pump cover 2 includes a suction port 2*a* that suctions a fluid and a discharge port 2*b* that discharges a pressurized fluid.

With the pump unit U accommodated in the accommodation recess 1*a*, the pump cover 2 is joined to the end face 1*f* of the housing body 1 and is fastened and fixed by a screw b1.

The motor cover 3 is made of a resin material, is joined to the end face 1*g* of the housing body 1 and covers the accommodation recess 1*b*. As illustrated in FIG. 2 and FIG. 3, the motor cover 3 includes a through hole 3*a* centered on the axis S, an annular recess 3*b*, a fixing part 3*c* that fixes the circuit board CB, and a connector 3*d* that accommodates a terminal connecting to the outside.

The through hole 3*a* is formed so as to allow insertion of a detected unit 5*b* fixed to an end of the rotating shaft 5 therethrough.

The annular recess 3*b* is formed in an annular shape centered on the axis S in order for a holder 3*e* of a cylindrical shape and made of metal to be fitted and fixed therein. The holder 3*e* made of metal allows a bearing B2 to be fitted thereto and holds the bearing B2, the bearing B2 rotatably supporting the rotating shaft 5.

The motor cover 3 is joined to the end face 1*g* of the housing body 1, and has the board cover 4 joined thereto from the outside. The motor cover 3 is fixed between the end face 1*g* and the board cover 4 by being fastened with a screw b2.

The board cover 4 is made of a metal plate, a resin material, or the like. In a state of enclosing the motor cover 3 in order to cover the circuit board CB, the board cover 4 is fastened and fixed to the end face 1*g* of the housing body 1 by the screw b2.

Figure 11:
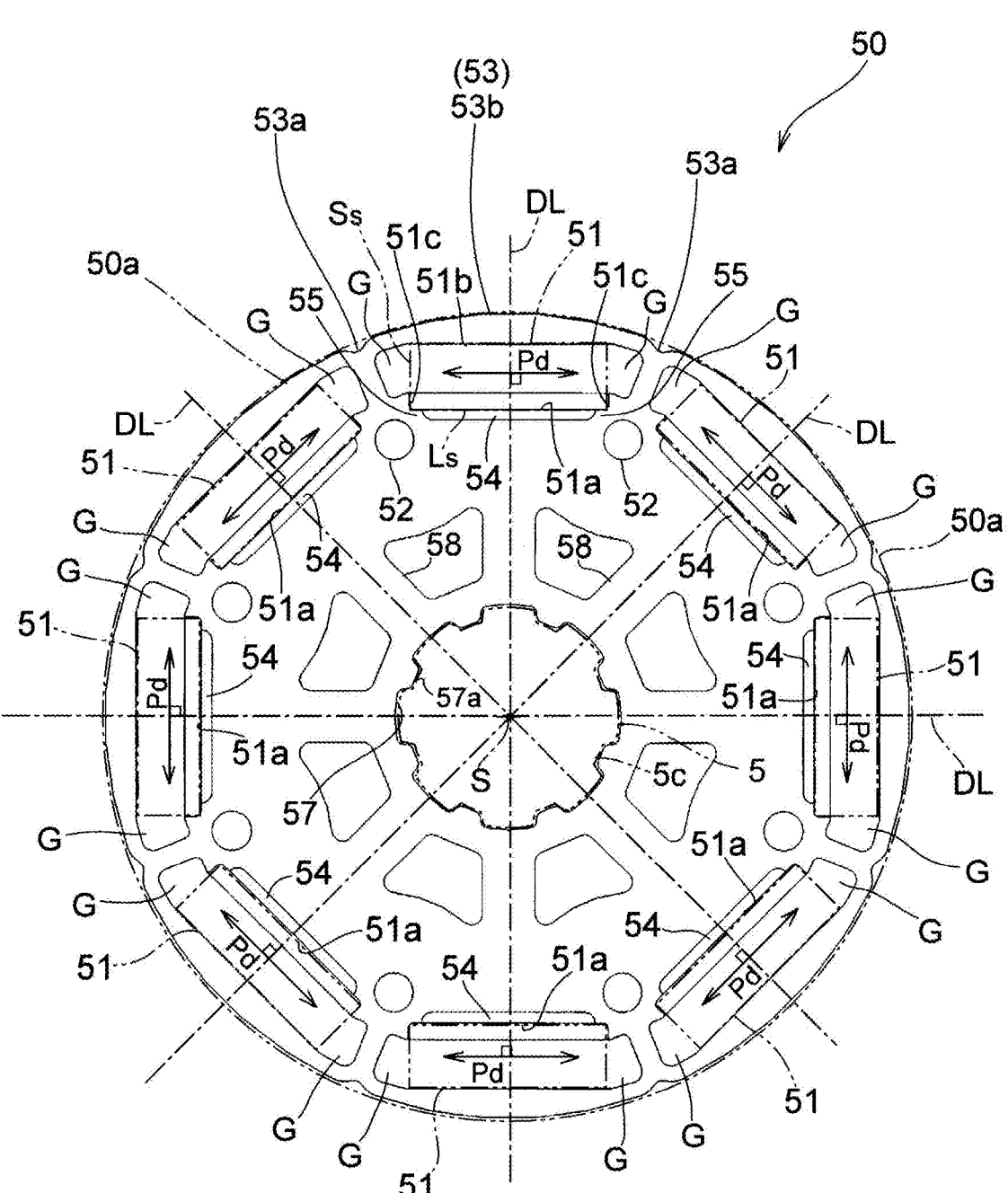
FIG. 11 is a plan view of the rotor core constituting a portion of the permanent magnet embedded motor, as viewed from one end side in a direction of the axis.

The rotating shaft 5 is made of a metal material and is formed in a columnar shape centered on the axis S. As illustrated in FIG. 2, FIG. 3, and FIG. 11, the rotating shaft 5 includes a connecting part 5*a* having width across flats on one end side, the detected unit 5*b* fixed on the other end side, and a key groove 5*c* on an outer periphery.

The rotating shaft 5 has the key groove 5*c* fitted into a shaft hole 57 of the rotor core 50 included in the permanent magnet embedded motor M, has the connecting part 5*a* connected to the inner rotor 11 of the pump unit U, has the outer periphery sealed by the lip type seal LS, and is rotatably supported by the bearings B1 and B2, so as to transmit a rotational force of the rotor Rt to the inner rotor 11.

In the detected unit 5*b*, a permanent magnet is fitted into an annular holder so that the N pole and the S pole alternate around the axis S. As illustrated in FIG. 2, the detected unit 5*b* is arranged so as to face a detection sensor C1 mounted on the circuit board CB.

The detected unit 5*b* functions as a detection object of the detection sensor C1 that detects a rotational angle position of the rotating shaft 5, that is, the rotor Rt.

As illustrated in FIG. 2 and FIG. 3, the pump unit U includes the inner rotor 11 and the outer rotor 12.

The inner rotor 11 is made of a material such as steel or sintered steel. The inner rotor 11 is formed in a substantially star-like shape that defines an end face that slides on a bottom wall surface of the accommodation recess 1*a* of the housing body 1 and an inner wall surface of the pump cover 2. The inner rotor 11 is formed as an outer gear including a fitting hole 11*a*, and a tooth profile formed by a trochoid curve including seven convex portions (mountains) and seven concave portions (valleys).

The fitting hole 11*a* is formed so as to allow the connecting part 5*a* of the rotating shaft 5 to be fitted therein.

The inner rotor 11 is rotated in a direction of arrow A in FIG. 1 and FIG. 2 by the rotating shaft 5 with the axis S as the center of rotation.

The outer rotor 12 is made of a material such as steel or sintered steel. The outer rotor 12 is formed in an annular shape that defines an end face that slides on the bottom wall surface of the accommodation recess 1*a* of the housing body 1 and the inner wall surface of the pump cover 2. The outer rotor 12 is formed as an inner gear including an outer peripheral surface 12*a* of a circular shape and eight convex portions and eight concave portions and having a tooth profile that may be engaged with the inner rotor 11.

The outer peripheral surface 12*a* contacts an inner peripheral surface of the accommodation recess 1*a* and is supported to be rotatable about an axis deviating from the axis S.

In conjunction with rotation of the inner rotor 11 rotating about the axis S, the outer rotor 12 rotates at a slower speed than the inner rotor 11.

By rotation of the inner rotor 11 and the outer rotor 12, the fluid may be suctioned into a pump chamber from the suction port 2*a*, and be discharged from the discharge port 2*b* while being pressurized.

The circuit board CB includes a component that controls driving of the permanent magnet embedded motor M. On the circuit board CB, wiring is printed, and various electronic components constituting a control circuit are mounted. As illustrated in FIG. 2, the detection sensor C1 facing the detected unit 5*b* is mounted on the circuit board CB.

The detection sensor C1 includes a plurality of Hall elements arranged in an arc shape centered on the axis S. The detection sensor C1 may detect a magnetic pole position (rotational angle position) in a rotation direction of the rotating shaft 5, that is, the rotor Rt.

As illustrated in FIG. 5 and FIG. 6, the permanent magnet embedded motor M includes: the stator St, including the stator core 20, the bobbin 30, and the coil 40; the rotor Rt, including the rotor core 50 and the permanent magnet 60; and the housing.

Here, as described above, the housing body 1 and the motor cover 3 function as the housing of the permanent magnet embedded motor M.

Figure 7:
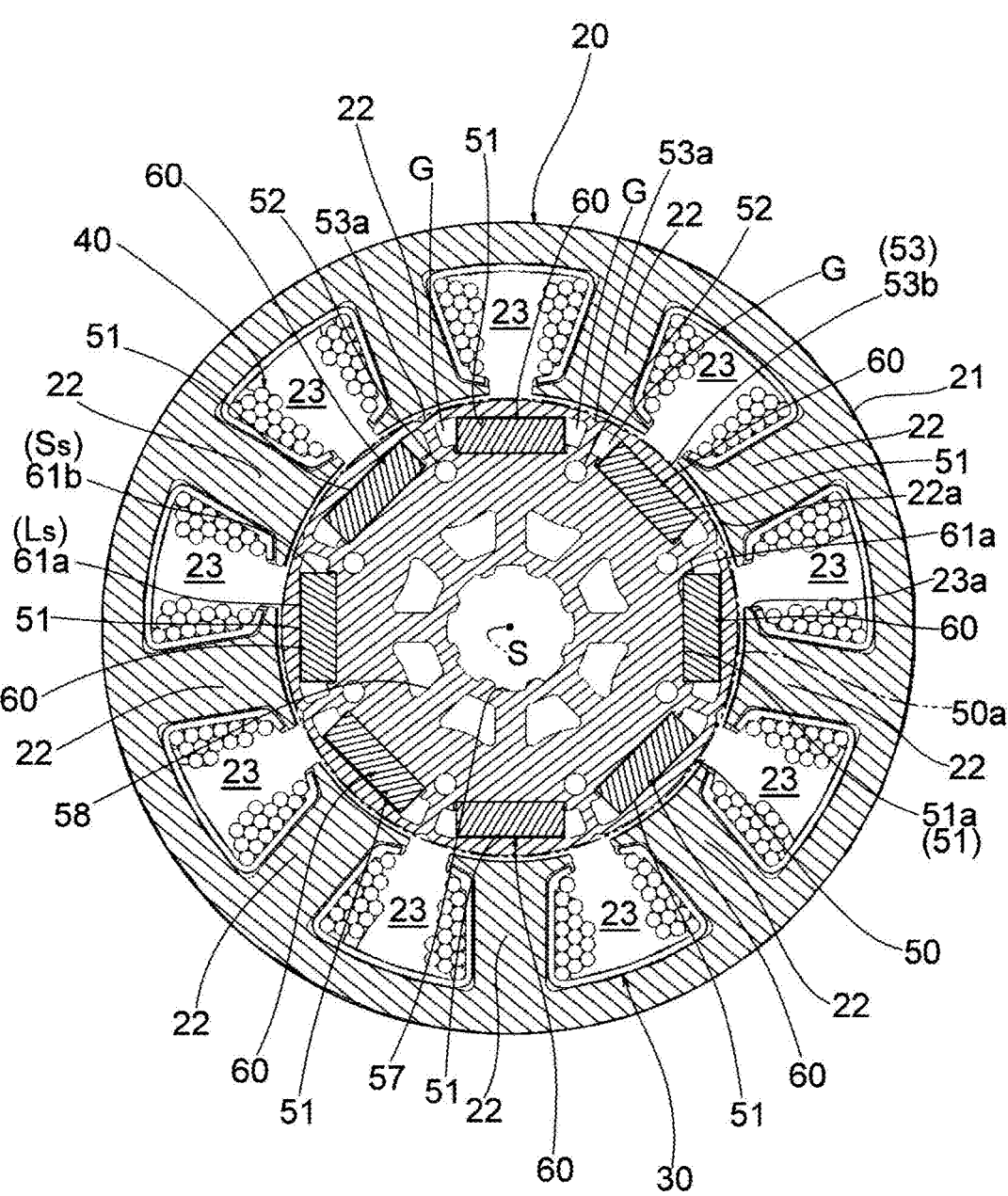
FIG. 7 is a cross-sectional view illustrating an internal structure of the stator and the rotor of the permanent magnet embedded motor, taken along a plane perpendicular to the axis of the rotor.

The stator core 20 is formed as a laminated body by press-molding a steel plate made of a magnetic material and then laminating the press-molded steel plate. As illustrated in FIG. 6 and FIG. 7, the stator core 20 includes: an annular part 21; nine teeth 22 as salient poles protruding from the annular part 21 toward the center (axis S) and arranged at equal intervals in the circumferential direction; and nine slots 23 arranged at equal intervals in the circumferential direction.

The nine teeth 22 are formed in the same shape rotationally symmetrical about the axis S and each include a tip surface 22a that defines a circular arc surface.

The nine tip surfaces 22a are arranged on a cylindrical surface having a predetermined diameter, and are arranged so as to face an outer peripheral contour 50a (outer peripheral magnetic pole surface 53b) of the rotor core 50 with a predetermined gap therebetween.

The nine slots 23 are formed in the same shape rotationally symmetrical about the axis S and each include an opening 23a of a predetermined width between the teeth 22 on both sides.

The bobbin 30 is formed in a two-piece structure using an electrically insulating resin material, and is assembled so as to sandwich the stator core 20 therebetween in the axis S direction.

The coil 40 employs a concentrated winding structure wound around each of the nine teeth 22 via the bobbin 30, and is divided into three phases and electrically connected.

The rotor core 50 is composed of a laminated body formed by press-molding a steel plate made of a magnetic material and then laminating the press-molded steel plate. As illustrated in FIG. 7, the rotor core 50 is formed to define the outer peripheral contour 50a of a cylindrical shape that faces the teeth 22 (tip surface 22a) of the stator core 20 with a predetermined gap therebetween.

As illustrated in FIG. 7 to FIG. 11, the rotor core 50 includes: eight insertion holes 51, arranged at equal intervals in the circumferential direction; eight through holes 52, arranged at equal intervals in the circumferential direction; eight outer peripheral magnetic pole parts 53, arranged at equal intervals in the circumferential direction; eight filling parts 54, arranged at equal intervals in the circumferential direction; an isolation wall 55, located on both sides of each filling part 54; a receiving part 56, formed corresponding to each filling part 54; the shaft hole 57, into which the rotating shaft 5 is fitted; and eight trapezoidal holes 58, arranged at equal intervals in the circumferential direction.

Here, the eight insertion holes 51, the eight through holes 52, the eight outer peripheral magnetic pole parts 53, the eight filling parts 54, the eight receiving parts 56, and the eight trapezoidal holes 58 are respectively formed rotationally symmetrical about the axis S and line symmetrical with respect to a straight line DL in the radial direction. Thus, only one of each of them will be described below.

The insertion hole 51 is an area where the permanent magnet 60 is inserted and fixed, that is, an area where the permanent magnet 60 is embedded. As illustrated in FIG. 11, the insertion hole 51 is formed to have a rectangular shape including a long side Ls and a short side Ss in a cross section perpendicular to the axis S. Here, the insertion hole 51 is formed to have a cross-sectional shape long in a vertical direction Pd with respect to the straight line DL in the radial direction of the rotor Rt.

Figure 12:
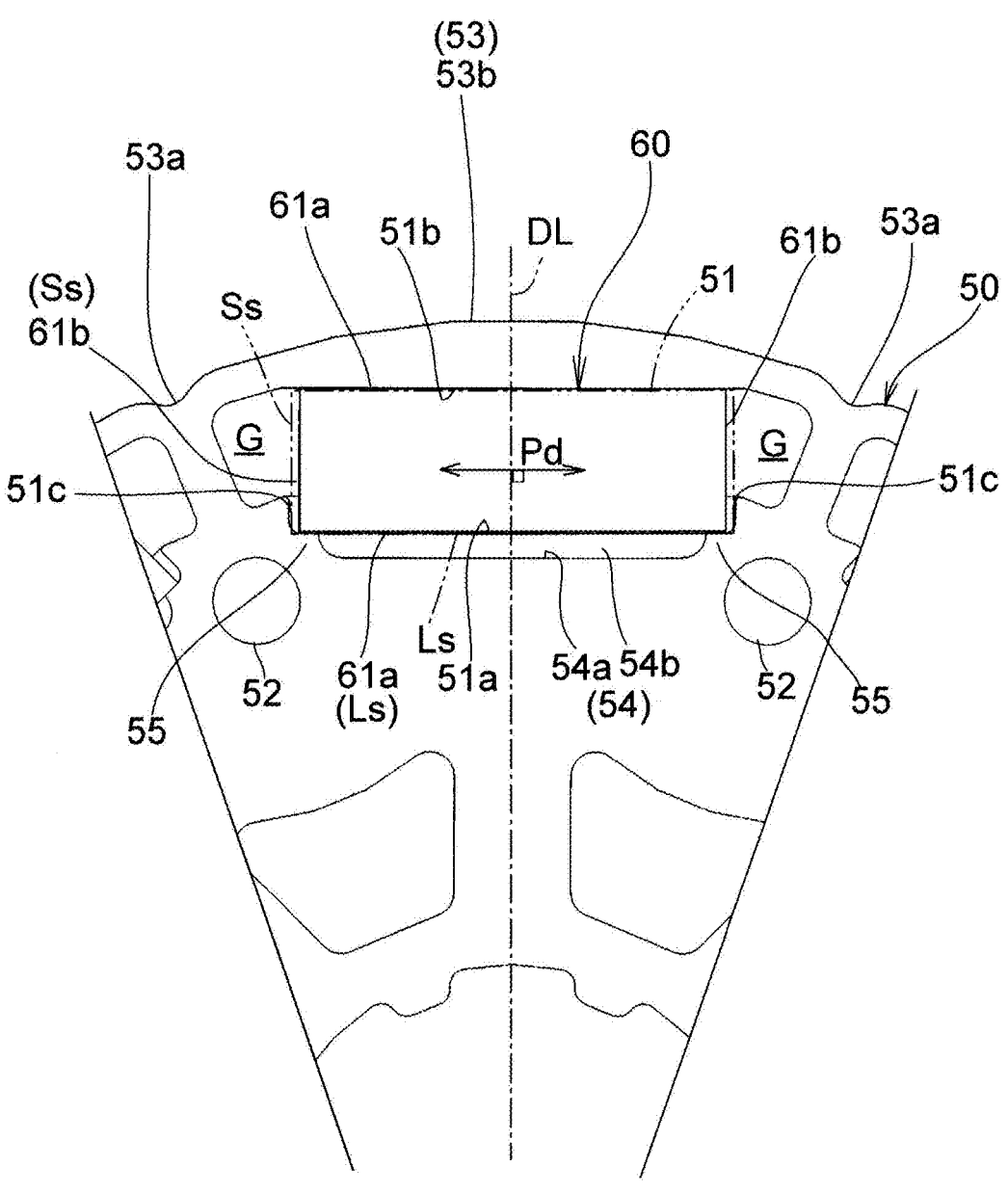
FIG. 12 is a partially enlarged view illustrating a relationship between an insertion hole and the permanent magnet in the rotor constituting a portion of the permanent magnet embedded motor.
Figure 13:
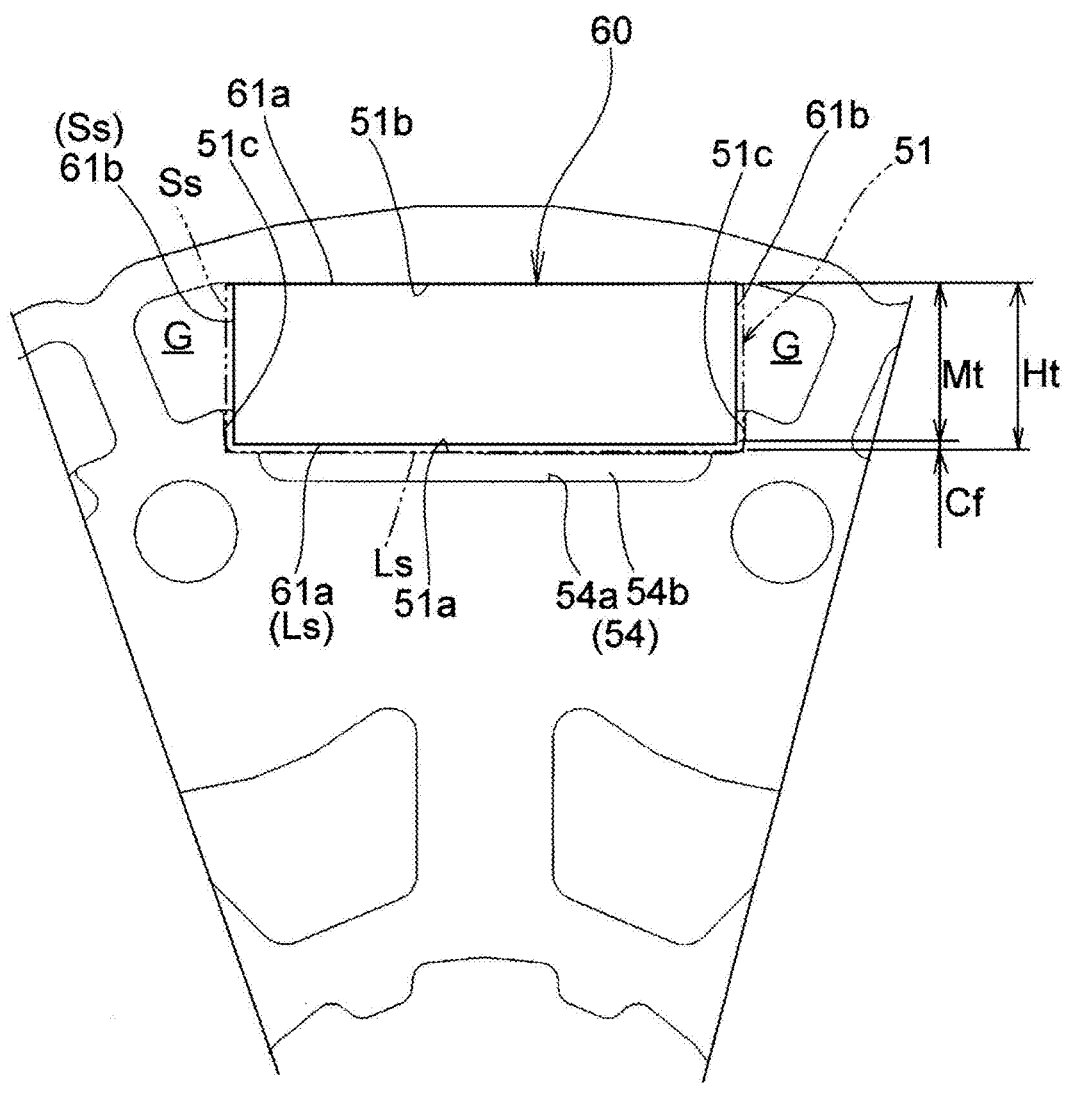
FIG. 13 is a partially enlarged view illustrating a dimensional relationship between the insertion hole and the permanent magnet in the rotor core constituting a portion of the permanent magnet embedded motor.
Figure 14:
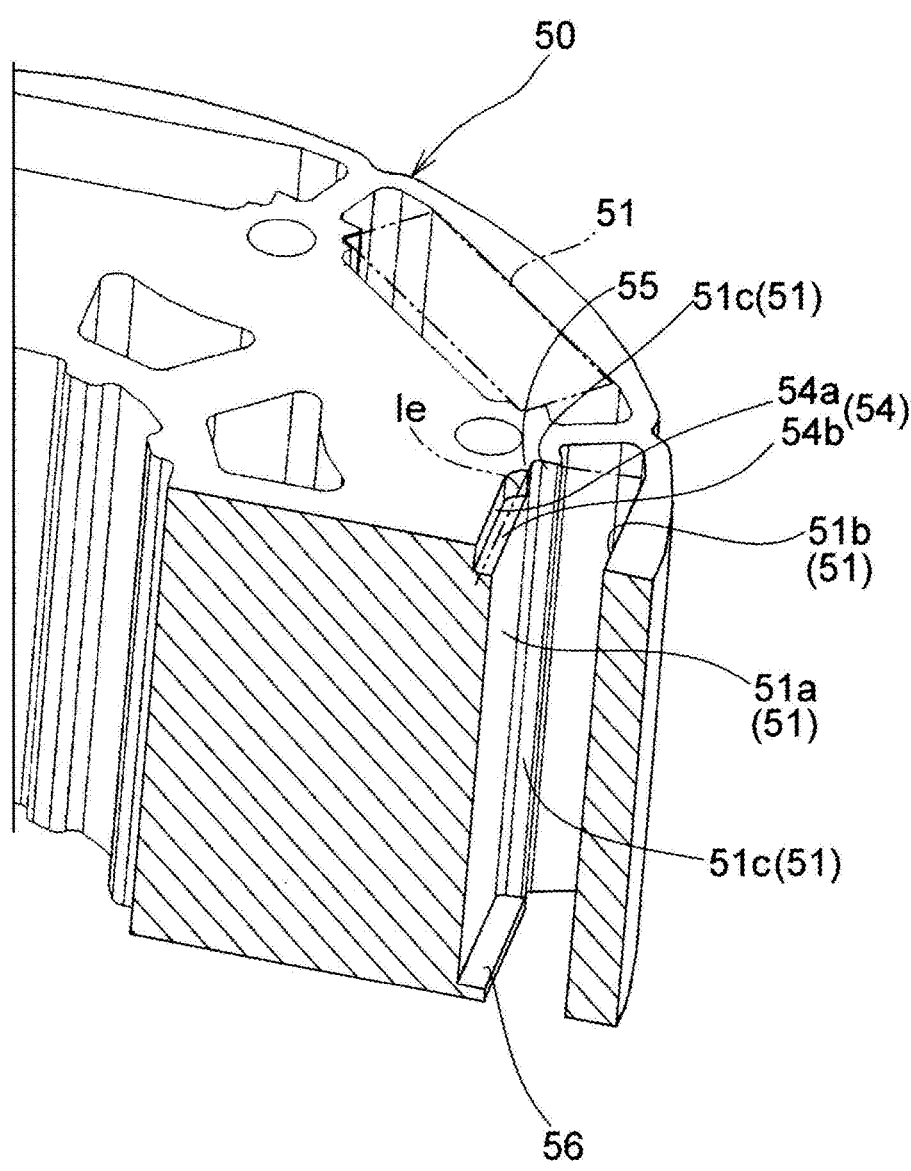
FIG. 14 is a perspective cross-sectional view partially illustrating areas of the insertion hole and a filling part in the rotor core constituting a portion of the permanent magnet embedded motor.

Specifically, as illustrated in FIG. 12 to FIG. 14, the insertion hole 51 is formed to include two wall surfaces 51a and 51b parallel to the vertical direction Pd, and two wall surfaces 51c and 51c perpendicular to the vertical direction Pd. The wall surface 51a functions as a wall surface to which the permanent magnet 60 adheres. Here, an edge area of the wall surfaces 51a and 51b defines the long side Ls of the insertion hole 51, and an edge area including the wall surfaces 51c and 51c defines the short side Ss of the insertion hole 51.

As described above, since the insertion hole 51 includes the two wall surfaces 51c and 51c, when the permanent magnet 60 is inserted into the insertion hole 51, while a gap G is provided at both ends of the insertion hole 51, the permanent magnet 60 can be suppressed or prevented from shifting in the vertical direction Pd.

Here, since the gap G is formed continuous with both ends of the insertion hole 51 in the long side Ls direction, short-circuiting of a line of magnetic force formed by the permanent magnet 60 can be prevented.

As illustrated in FIG. 11 and FIG. 12, in a plane perpendicular to the axis S, between the insertion holes 51 and 51 in the circumferential direction and radially inside the insertion holes 51 and 51, the through hole 52 is formed to provide a gap having a circular cross section.

The through hole 52 functions as a flux barrier that suppresses or prevents leakage and short-circuiting of the line of magnetic force. The through hole 52 also acts as a positioning part into which a jig that positions the rotor core 50 is inserted when the permanent magnet 60 is assembled to the insertion hole 51.

The outer peripheral magnetic pole part 53 is an area where a magnetic pole corresponding to the permanent magnet 60 inserted into the insertion hole 51 is generated. As illustrated in FIG. 11, the outer peripheral magnetic pole part 53 is of a shape line symmetrical with respect to the straight line DL in the radial direction, and includes the outer peripheral magnetic pole surface 53b between a pair of depressions 53a and 53a.

Figure 8:
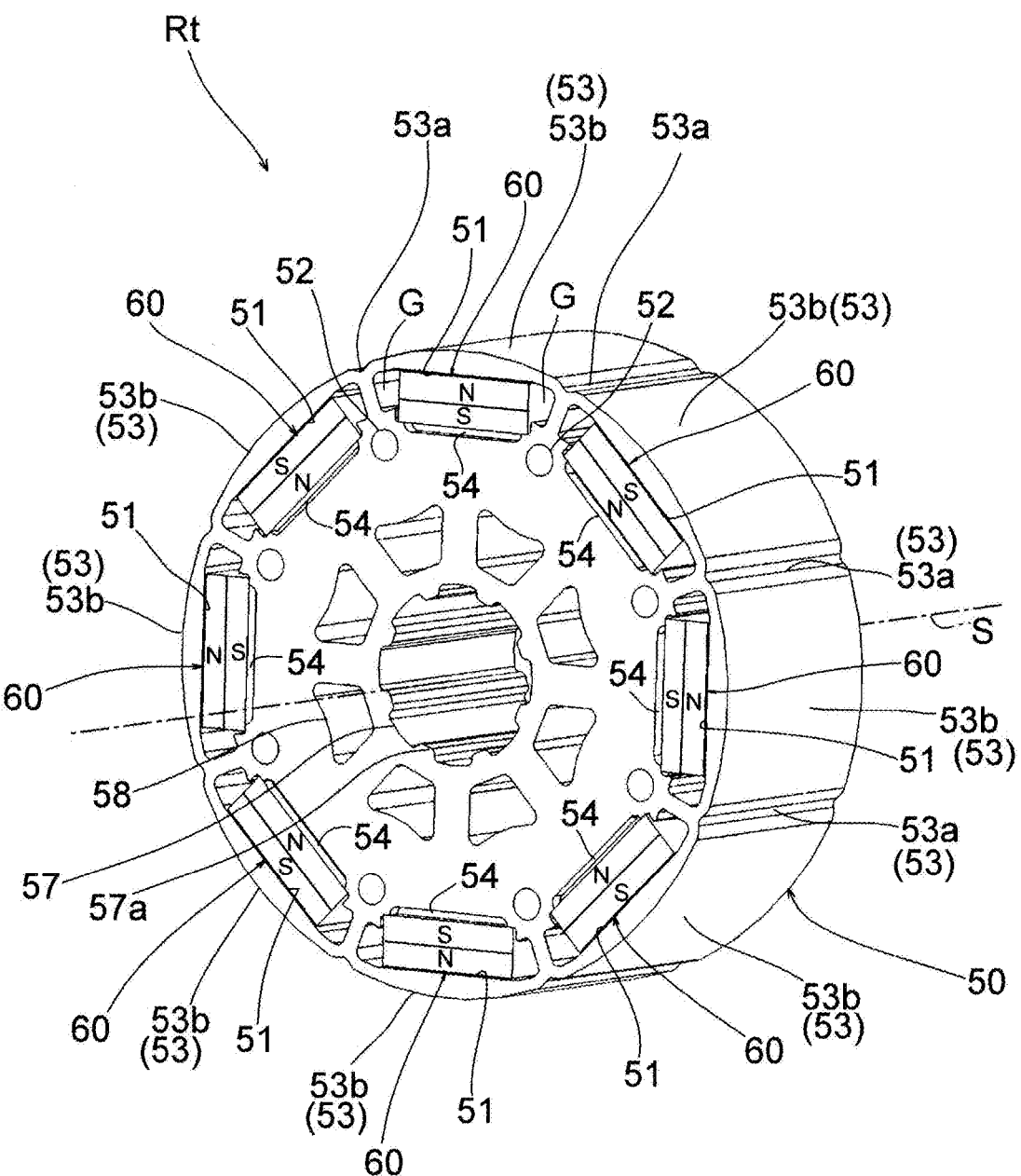
FIG. 8 is an external perspective view of the rotor constituting a portion of the permanent magnet embedded motor, as viewed from one end side.
Figure 9:
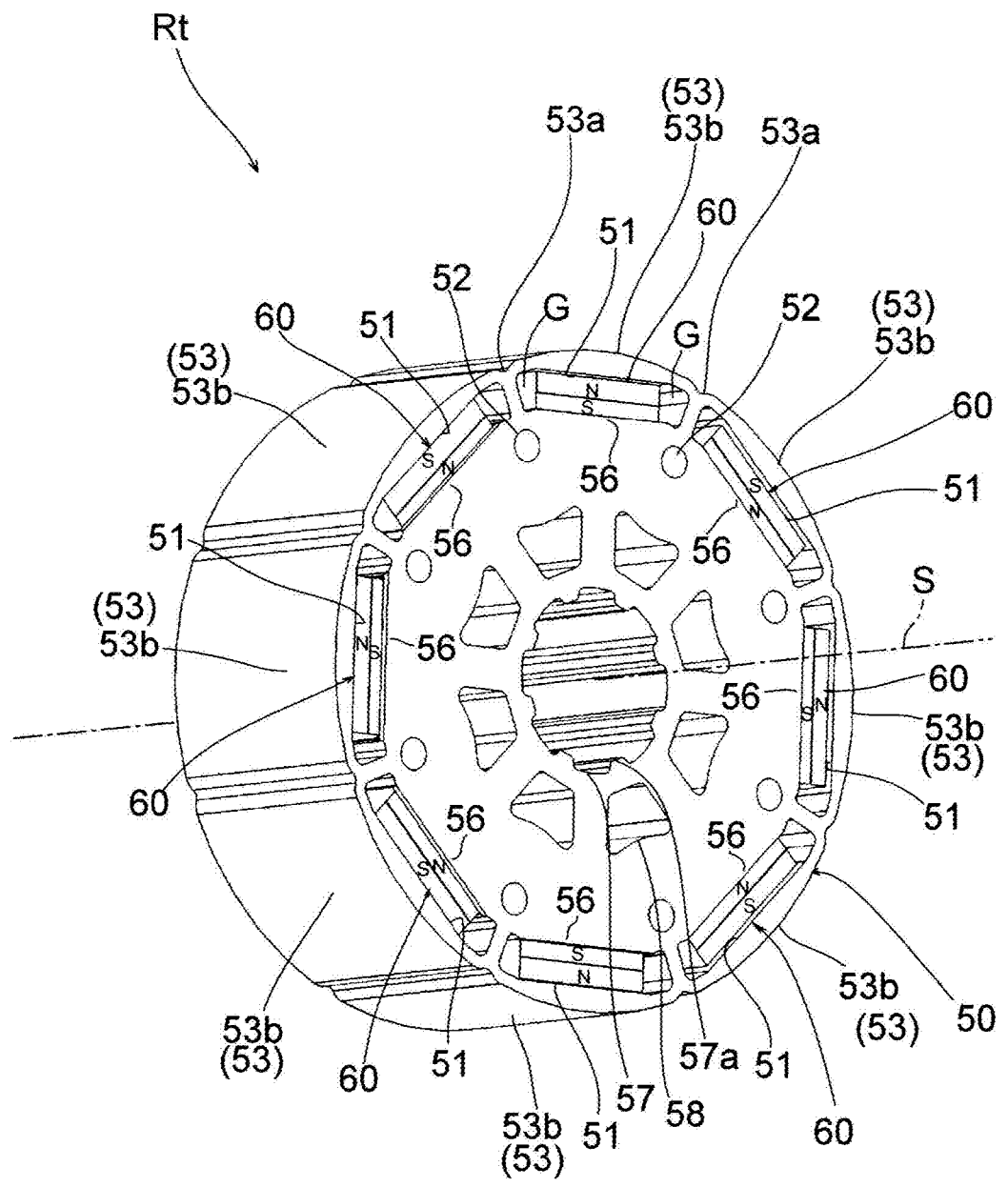
FIG. 9 is an external perspective view of the rotor constituting a portion of the permanent magnet embedded motor, as viewed from the other end side.

The pair of depressions 53a and 53a are line symmetrical with respect to the straight line DL, and are formed in a V-groove shape extending in the axis S direction, as illustrated in FIG. 8 and FIG. 9.

The outer peripheral magnetic pole surface 53b is an area sandwiched between the pair of depressions 53a and 53a in the circumferential direction. The outer peripheral magnetic pole surface 53b is formed into a cylindrical curved surface that defines the outer peripheral contour 50a, that is, a curved surface having a curvature of 2/D when the outer peripheral contour 50a has an outer diameter dimension of D. The outer peripheral magnetic pole surface 53b faces the tip surface 22a of the teeth 22 with a predetermined gap therebetween.

The filling part 54 is an area where an adhesive for fixing the permanent magnet 60 is filled. The filling part 54 is formed adjacent to and radially inside the insertion hole 51.

Figure 10:
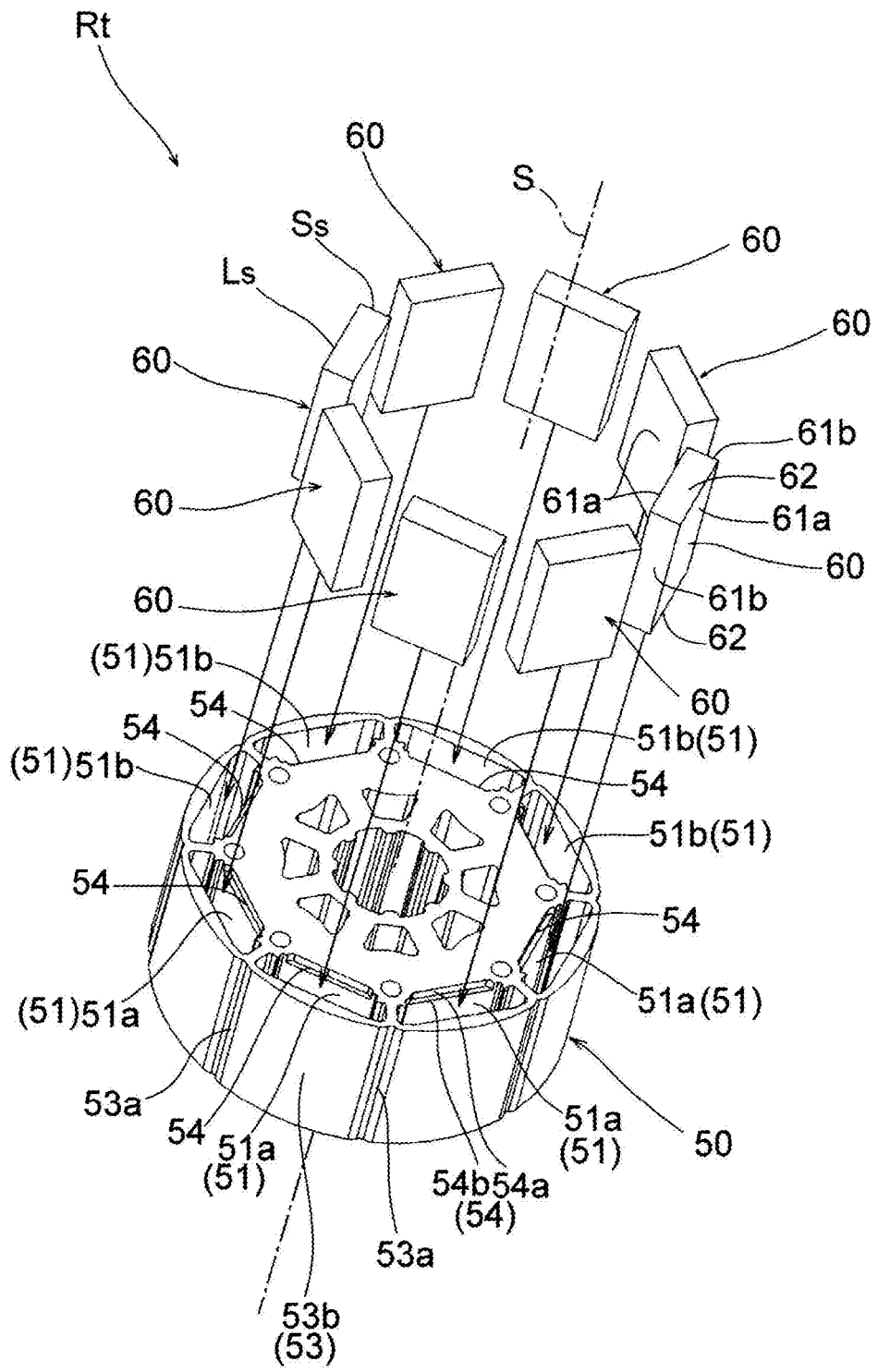
FIG. 10 is an exploded perspective view of a rotor core and a permanent magnet in the rotor constituting a portion of the permanent magnet embedded motor.

That is, as illustrated in FIG. 10, FIG. 12, and FIG. 14, at one opening end of the insertion hole 51, the filling part 54 is of a shape obtained by cutout in a stepped-down manner in an inner edge area Ie of the insertion hole 51 corresponding to the wall surface 51a, that is, the inner edge area Ie along the long side Ls of the insertion hole 51.

Specifically, the filling part 54 includes a side surface 54a long in the vertical direction Pd, and a bottom surface 54b long in the vertical direction Pd and flat in a direction perpendicular to the axis S.

Figure 16:
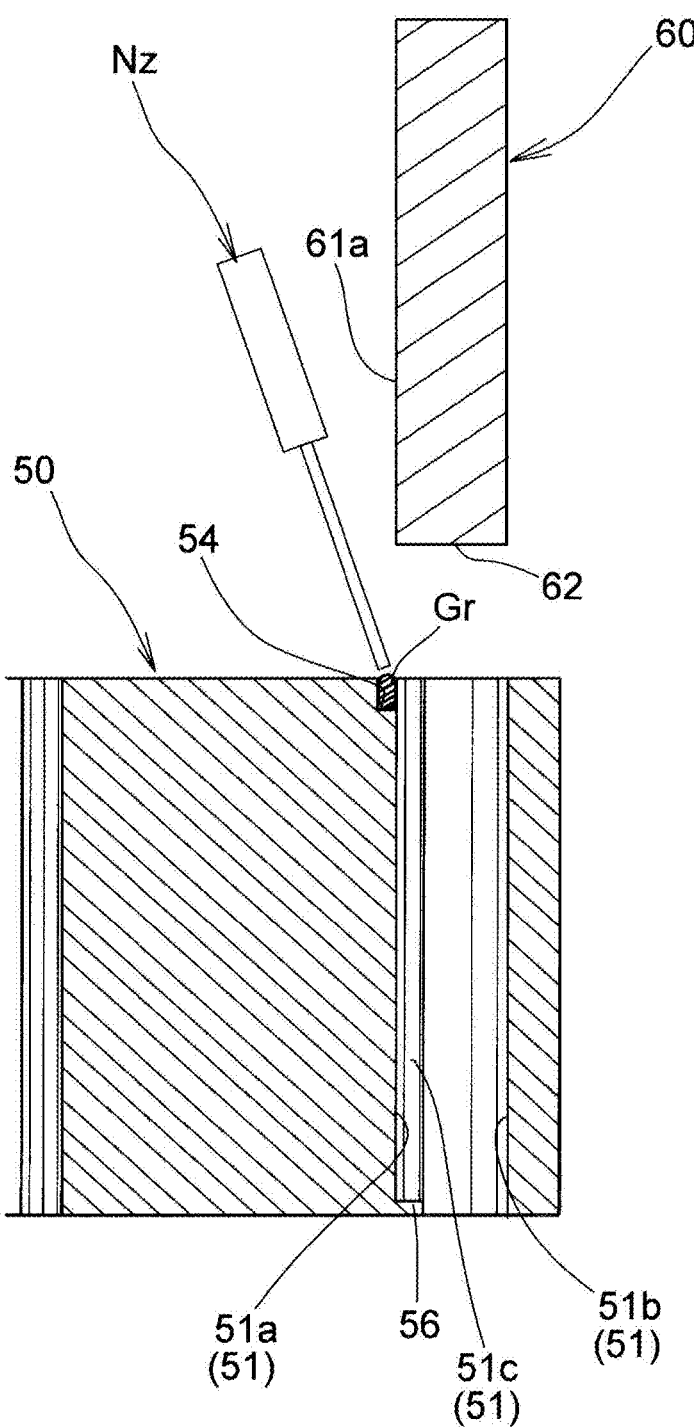
FIG. 16 is a process diagram illustrating an operation during fitting of the permanent magnet into the insertion hole of the rotor core constituting a portion of the permanent magnet embedded motor.

As illustrated in FIG. 16, in the filling part 54, the side surface 54a acts as a weir that prevents an adhesive Gr that is filled from flowing away from the insertion hole 51. In a state before the permanent magnet 60 is inserted, the bottom surface 54b acts to keep the adhesive Gr that is filled.

That is, after the adhesive Gr is filled in the filling part 54, by inserting the permanent magnet 60 into the insertion hole 51, the adhesive Gr is extended and applied between a wall surface 61a that defines the long side Ls of the permanent magnet 60 and the wall surface 51a that defines the long side Ls of the insertion hole 51.

Here, since the filling part 54 is formed adjacent to and inside the insertion hole 51 in the radial direction (straight line DL direction), an area outside the insertion hole 51 can be effectively used as the outer peripheral magnetic pole part 53.

As illustrated in FIG. 12, the isolation wall 55 is formed so as to separate the filling part 54 from the wall surface 51c that defines the short side Ss of the insertion hole 51 in the vicinity of both ends of the insertion hole 51 in the long side Ls direction. That is, the filling part 54 is blocked by the isolation wall 55 so as not to communicate with an area facing the wall surface 51c.

According to this, the adhesive Gr filled in the filling part 54 can be prevented from flowing out to a wall surface 61b side that defines the short side Ss of the permanent magnet 60, the adhesive Gr can be kept by the wall surface 61a that defines the long side Ls of the permanent magnet 60, and a small amount of the adhesive Gr can be effectively used in adhesion of the wall surface 61a and the wall surface 51a.

Figure 18:
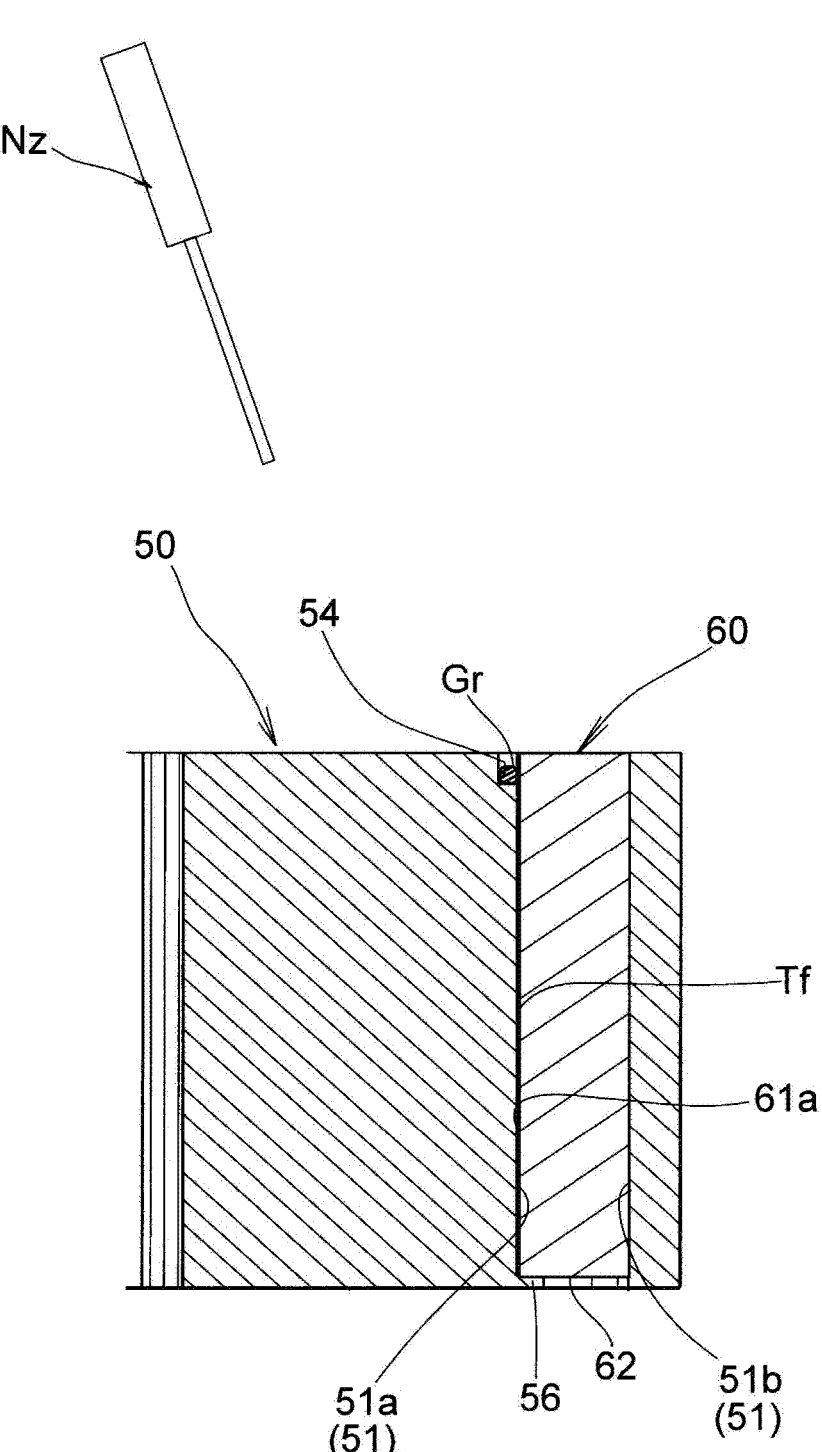
FIG. 18 is a process diagram illustrating an operation during fitting of the permanent magnet into the insertion hole of the rotor core constituting a portion of the permanent magnet embedded motor.

As illustrated in FIG. 9, FIG. 14, and FIG. 18, at the other opening end of the insertion hole 51, the receiving part 56 is formed as a protruding piece protruding inward, receives an end face 62 of the permanent magnet 60 inserted into the insertion hole 51, and positions the permanent magnet 60 in the axis S direction.

According to this, after the adhesive Gr is filled in the filling part 54, simply by inserting the permanent magnet 60 into the insertion hole 51, positioning and adhesion operations are completed.

As illustrated in FIG. 11, the shaft hole 57 fits the rotating shaft 5, and includes eight protrusions 57a that are fitted into the key groove 5c of the rotating shaft 5.

The trapezoidal holes 58 are formed to be arranged at equal intervals in the circumferential direction radially outside the shaft hole 57. The trapezoidal hole 58 contributes to reduction in the weight of the rotor core 50, and allows elastic deformation of a peripheral area of the protrusion 57a when the rotating shaft 5 is fitted into the shaft hole 57. Accordingly, a fitting operation of the rotating shaft 5 can be smoothly performed.

As illustrated in FIG. 7, FIG. 10, and FIG. 12, eight permanent magnets 60 are formed in the same shape and are fitted and fixed in each insertion hole 51. That is, the permanent magnet 60 is formed to have a rectangular flat plate shape including the long side Ls and the short side Ss in a cross section perpendicular to the axis S. Here, the permanent magnet 60 is formed to have a cross-sectional shape long in the vertical direction Pd.

Specifically, as illustrated in FIG. 10 and FIG. 12, the permanent magnet 60 is formed to include two wall surfaces 61a and 61a parallel to the vertical direction Pd, two wall surfaces 61b and 61b perpendicular to the vertical direction Pd, and two end faces 62 and 62 extending in the axis S direction. Here, the wall surfaces 61a and 61a define the long side Ls of the permanent magnet 60, and the wall surfaces 61b and 61b define the short side Ss of the permanent magnet 60.

As illustrated in FIG. 8 and FIG. 9, the eight permanent magnets 60 are oriented so that the N pole and the S pole face each other in the radial direction (straight line DL direction) of the rotor core 50, and are inserted at equal intervals in the circumferential direction about the axis S so that the poles facing outward alternate. With the permanent magnet 60 inserted into the insertion hole 51, the gap G is defined at both ends of the permanent magnet 60 in the vertical direction Pd.

Here, since the gap G is provided on both sides of the permanent magnet 60, it can be prevented that a line of magnetic force short-circuits itself from the N pole to the S pole of the permanent magnet 60.

Since one permanent magnet 60 of a simple flat plate shape is arranged corresponding to one outer peripheral magnetic pole part 53, compared to the configuration in which a permanent magnet of a curved shape is arranged corresponding to one outer peripheral magnetic pole part 53 or the configuration in which a plurality of permanent magnets are arranged corresponding to one outer peripheral magnetic pole part 53, the structure can be simplified and the cost can be reduced.

Figure 15:
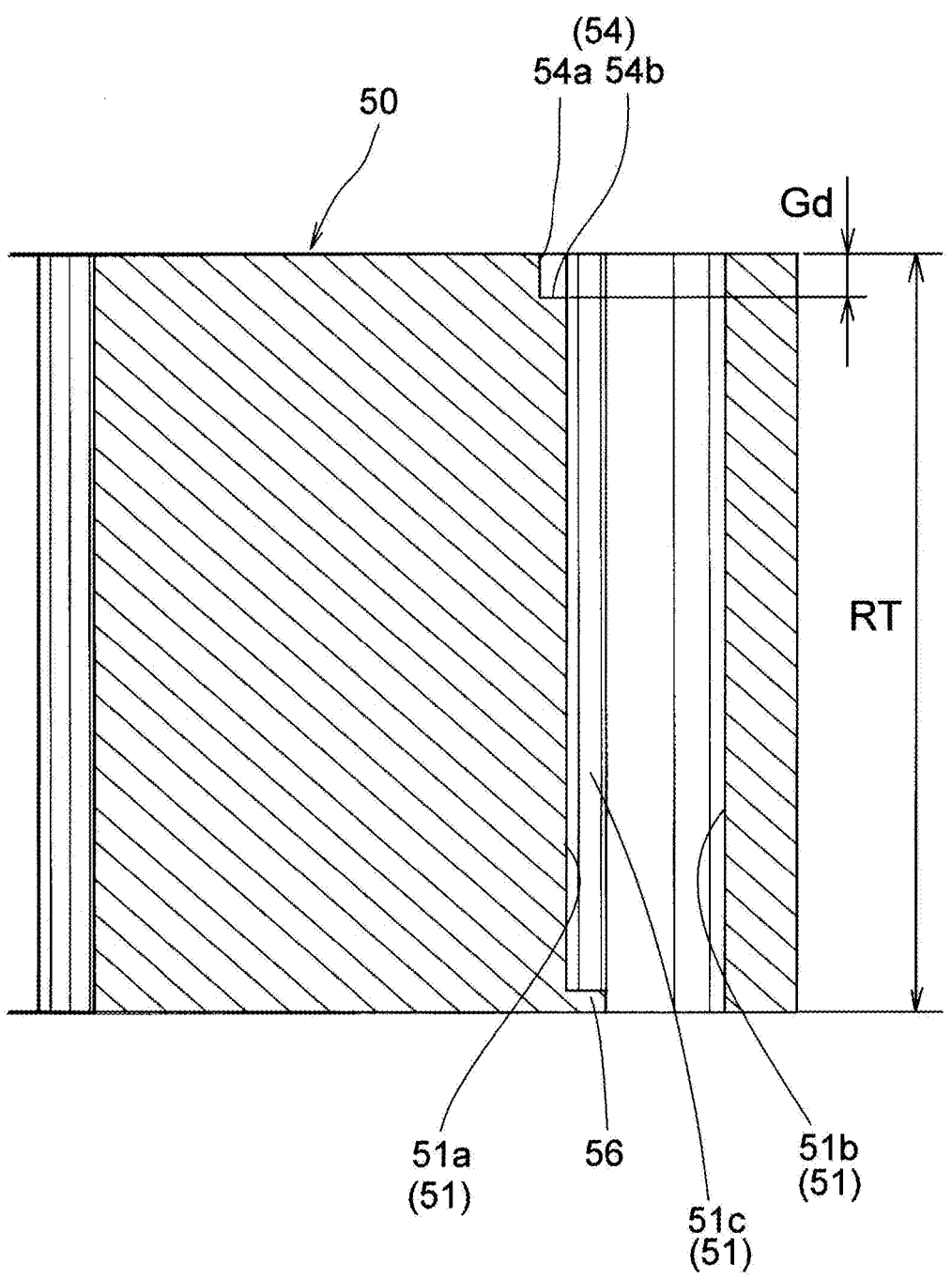
FIG. 15 is a partial cross-sectional view illustrating a dimensional relationship between the areas of the insertion hole and the filling part in the rotor core constituting a portion of the permanent magnet embedded motor, cut along a plane including the axis.

As illustrated in FIG. 15, in the permanent magnet embedded motor M having the above configuration, when Gd denotes a depth dimension of the filling part 54 of the rotor core 50 in the axis S direction, and RT denotes a thickness dimension of the rotor core 50 in the axis S direction, the permanent magnet embedded motor M is preferably formed to satisfy $0.05 \leq Gd/RT \leq 0.06$. Specifically, the dimensions are set so that, for example, RT=about 20 mm to 30 mm and Gd=about 1.0 mm to 1.8 mm. The value of Gd/RT is not limited to the above range.

As described above, by setting the ratio of the depth dimension Gd of the filling part 54 to the thickness dimension RT of the rotor core 50, a small amount of the adhesive Gr can be filled in the filling part 54 and the adhesive Gr can be applied to the wall surface 61a of the permanent magnet 60.

As illustrated in FIG. 13, when Mt denotes a thickness dimension of the permanent magnet 60 in the short side Ss direction, Ht denotes a pore dimension of the insertion hole 51 in the short side Ss direction, Cf denotes a gap dimension between the permanent magnet 60 and the insertion hole 51, and Cf=Ht−Mt, the permanent magnet embedded motor M is preferably formed to satisfy $0.1 \text{ mm} \leq Cf \leq 0.2 \text{ mm}$.

As described above, by setting the gap dimension Cf, as the permanent magnet 60 is inserted into the insertion hole 51, the adhesive Gr filled in the filling part 54 can be extended and applied into a thin film between the wall surface 61a and the wall surface 51a, and cohesive failure or the like that may occur when a layer of the adhesive Gr is thick can be prevented. Accordingly, the permanent magnet 60 can be firmly adhered and fixed, and the durability of the rotor Rt is improved. The value of Cf is not limited to the above range.

Next, an assembly operation of the permanent magnet 60 into the insertion hole 51 of the rotor core 50 will be described with reference to FIG. 16 to FIG. 18.

First, as illustrated in FIG. 16, a small amount of the adhesive Gr is filled into the filling part 54 of the rotor core 50 using a nozzle Nz. As the adhesive Gr, a non-fluid adhesive having a relatively high viscosity, that is, a paste-like adhesive, may be used. For example, a one-component epoxy-based adhesive may be applied.

Figure 17:
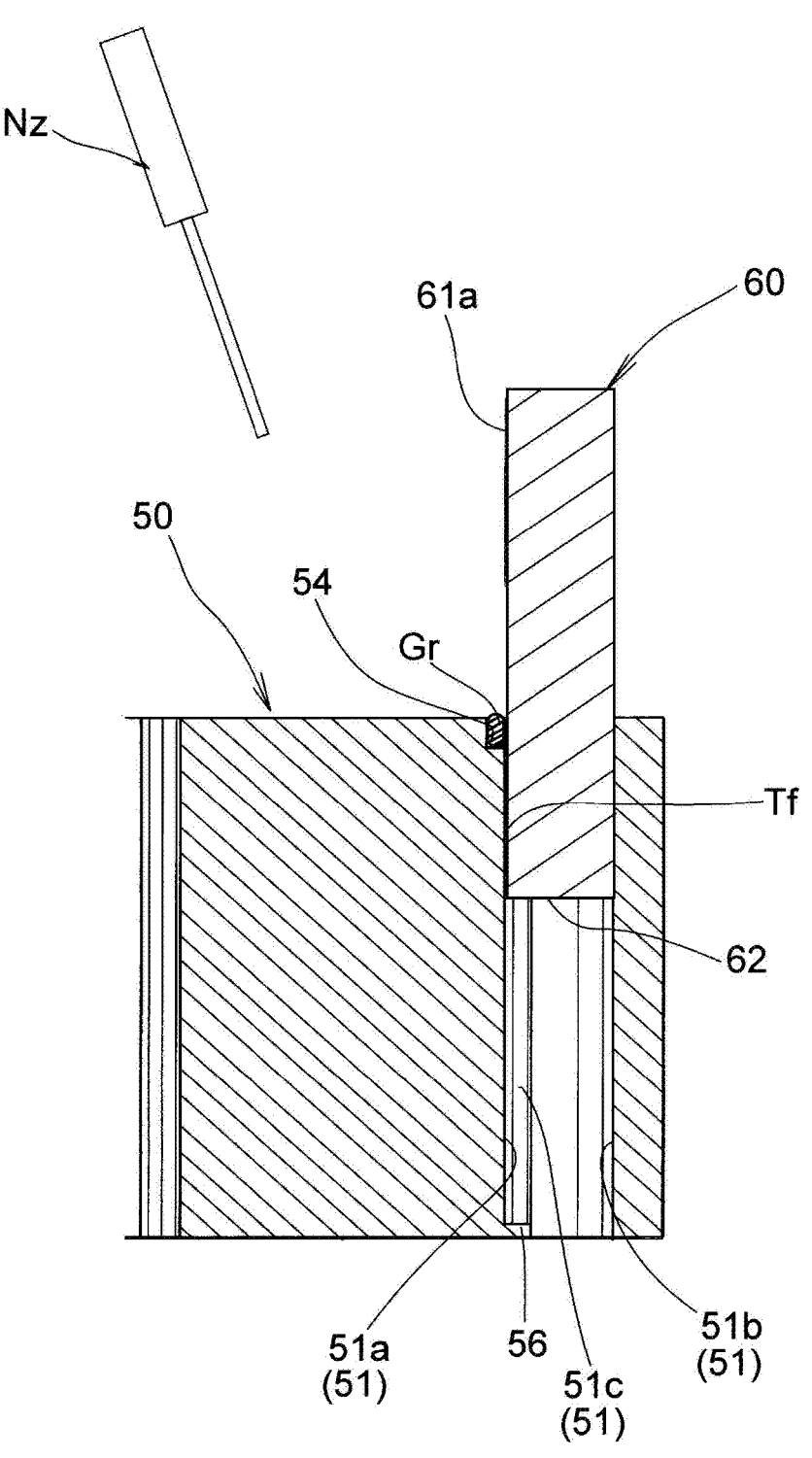
FIG. 17 is a process diagram illustrating an operation during fitting of the permanent magnet into the insertion hole of the rotor core constituting a portion of the permanent magnet embedded motor.

Next, as illustrated in FIG. 17, the permanent magnet 60 is inserted into the insertion hole 51 of the rotor core 50. At this time, the adhesive Gr of the filling part 54 is extended while adhering to the wall surface 61a of the permanent magnet 60 in a gap formed between the wall surface 61a and the wall surface 51a.

As illustrated in FIG. 18, the permanent magnet 60 is completely inserted into the insertion hole 51, has the end face 62 thereof contacting the receiving part 56, and is positioned in the axis S direction.

Figure 19:
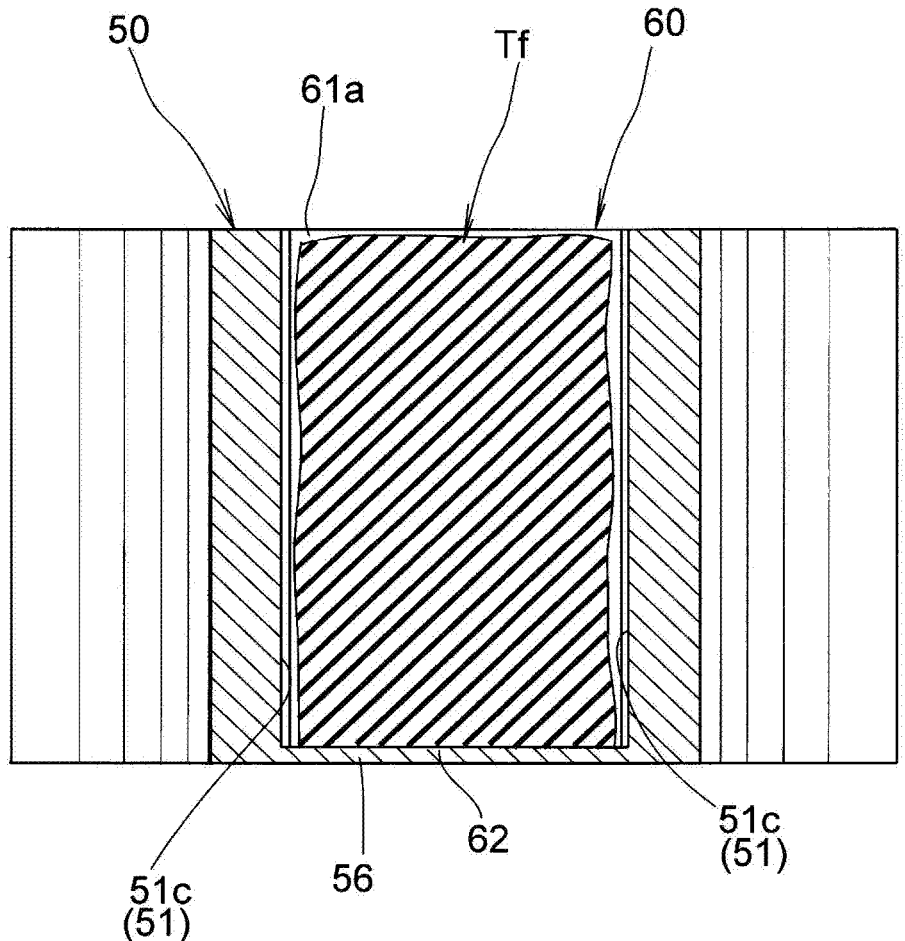
FIG. 19 is a schematic diagram illustrating an adhesion condition of an adhesive on a wall surface of the permanent magnet adhered through the processes illustrated in FIG. 16 to FIG. 18.

During this insertion, a film layer Tf of the adhesive Gr is formed between the wall surface 61a of the permanent magnet 60 and the wall surface 51a of the insertion hole 51, as illustrated in FIG. 19.

In the insertion operation, the adhesive Gr filled in the filling part 54 is prevented by the isolation wall 55 from flowing out to the wall surface 61b side that defines the short side Ss of the permanent magnet 60. Accordingly, the adhesive Gr is kept on the wall surface 61a side that defines the long side Ls of the permanent magnet 60, and may be effectively used in adhesion of the wall surface 61a and the wall surface 51a.

As described above, according to the permanent magnet embedded motor M having the above configuration, at one opening end of the insertion hole 51, the filling part 54 is of a shape obtained by cutout in a stepped-down manner in the inner edge area Ie of the insertion hole 51 corresponding to the wall surface 51a to which the permanent magnet 60 adheres, more specifically in the present embodiment, a shape obtained by cutout in a stepped-down manner in the inner edge area Ie along the long side Ls of the insertion hole 51 at one opening end of the insertion hole 51. Thus, waste of the adhesive Gr that fixes the permanent magnet 60 can be eliminated, and the permanent magnet 60 can be firmly adhered with a small amount of the adhesive Gr. Accordingly, the durability of the rotor Rt can be improved.

According to the permanent magnet embedded motor M having the above configuration, reliability of a pumping operation can be improved by a drive source to which the permanent magnet 60 is firmly fixed.

An operation of the permanent magnet embedded motor M having the above configuration is similar to that of a conventional permanent magnet embedded motor. Thus, a description thereof will be omitted herein.

In the above embodiment, the insertion hole 51 in which a cross section perpendicular to the axis S is of a rectangular shape including the long side Ls and the short side Ss is shown as the insertion hole; the permanent magnet 60 in which a cross section perpendicular to the axis S is of a rectangular flat plate shape including the long side Ls and the short side Ss is shown as the permanent magnet; and the filling part 54 of a shape obtained by cutout in a stepped-down manner in the inner edge area Ie along the long side Ls of the insertion hole 51 is shown as the filling part. However, the present disclosure is not limited thereto.

For example, if the insertion hole includes a wall surface to which the permanent magnet adheres, and the filling part is of a shape obtained by cutout in a stepped-down manner in an inner edge area of the insertion hole corresponding to a wall surface of the insertion hole at one opening end of the insertion hole, an insertion hole that is arcuately curved and a permanent magnet that is arcuately curved to correspond to the insertion hole may be employed.

In the above embodiment, the insertion hole 51 having a cross-sectional shape long in the vertical direction Pd with respect to the radial direction (straight line DL direction) of the rotor core 50 is shown as the insertion hole. However, an insertion hole having a cross-sectional shape long in any other direction may be employed.

In the above embodiment, the filling part 54 that is adjacent to and radially inside the insertion hole 51 is shown as the filling part. However, the present disclosure is not limited thereto. A filling part that is adjacent to and radially outside the insertion hole 51 may be employed; two adjacent filling parts that are radially inside and outside the insertion hole 51 may be employed.

In this case, two wall surfaces 51a and 51b can be used as the wall surface to which the permanent magnet 60 of the insertion hole 51 adheres.

In the above embodiment, the permanent magnet embedded motor M is shown including the stator St that includes nine teeth 22 and nine slots 23 and the rotor Rt that includes eight insertion holes 51 (that is, eight permanent magnets 60). That is, in the permanent magnet embedded motor M, the number of magnetic poles of the rotor Rt is eight, and the number of teeth and slots of the stator St is nine.

However, the present disclosure is not limited to the above configuration. The present disclosure can be similarly applied in a general permanent magnet embedded motor satisfying the conditions that the number of magnetic poles of the rotor is 2n (n is a natural number) and the number of each of teeth and slots of the stator is 3n (n is a natural number), or a permanent magnet embedded motor having other numbers of magnetic poles, teeth and slots.

In the above embodiment, a case is shown where, in a pump device using the permanent magnet embedded motor M as the drive source, a trochoid pump is employed as the pump unit. However, the present disclosure is not limited thereto. A vane pump or any other type of pump may be employed.

As described above, in the permanent magnet embedded motor of the present disclosure, waste of the adhesive that fixes the permanent magnet can be eliminated and the permanent magnet can be firmly adhered with a small amount of the adhesive. Thus, the permanent magnet embedded motor of the present disclosure can of course be applied as a drive source for a pump device, and is useful as a drive source for various other devices.

The invention claimed is:

1. A permanent magnet embedded motor, comprising:
 a stator of an annular shape; and
 a rotor, arranged inside the stator, comprising a rotor core and permanent magnets, and rotating about a predetermined axis, the rotor core comprising insertion holes arranged in a circumferential direction and filling parts provided adjacent to the insertion holes respectively for filling with an adhesive, each of the permanent magnets being inserted into the corresponding insertion hole, wherein
 each of the insertion holes comprises a wall surface to which the permanent magnet adheres; and
 at one opening end of the insertion hole, the corresponding filling part is of a shape obtained by cutout in a stepped-down manner in an inner edge area of the insertion hole corresponding to the wall surface, wherein
 a cross section of the insertion hole perpendicular to the axis is of a rectangular shape comprising a long side and a short side;
 a cross section of the permanent magnet perpendicular to the axis is of a rectangular flat plate shape comprising a long side and a short side; and the filling part is of a shape obtained by cutout in a stepped-down manner in an inner edge area along the long side of the insertion hole.

2. The permanent magnet embedded motor according to claim 1, wherein the insertion hole has a cross-sectional shape long in a vertical direction with respect to a radial direction of the rotor;

the permanent magnet has a cross-sectional shape long in the vertical direction; and the filling part comprises a bottom surface long in the vertical direction and flat in a direction perpendicular to the axis.

3. The permanent magnet embedded motor according to claim 1, wherein the filling part is formed adjacent to and radially inside the corresponding insertion hole.

4. The permanent magnet embedded motor according to claim 1, wherein $0.05 \leq Gd/RT \leq 0.06$ is satisfied, where Gd denotes a depth dimension of the filling part in a direction of the axis, and RT denotes a thickness dimension of the rotor core in the direction of the axis.

5. The permanent magnet embedded motor according to claim 1, wherein $0.1 \text{ mm} \leq Cf \leq 0.2 \text{ mm}$ is satisfied, where Mt denotes a thickness dimension of the permanent magnet in a direction of the short side, Ht denotes a pore dimension of the insertion hole in the direction of the short side, Cf denotes a gap dimension between the permanent magnet and the insertion hole, and $Cf=Ht-Mt$.

6. The permanent magnet embedded motor according to claim 1, wherein $0.05 \leq Gd/RT \leq 0.06$ and $0.1 \text{ mm} \leq Cf \leq 0.2 \text{ mm}$ are satisfied, where Gd denotes a depth dimension of the filling part in a direction of the axis, RT denotes a thickness dimension of the rotor core in the direction of the axis, Mt denotes a thickness dimension of the permanent magnet in a direction of the short side, Ht denotes a pore dimension of the insertion hole in the direction of the short side, Cf denotes a gap dimension between the permanent magnet and the insertion hole, and $Cf=Ht-Mt$.

7. The permanent magnet embedded motor according to claim 1, wherein the insertion hole has a cross-sectional shape long in a vertical direction with respect to a radial direction of the rotor;

the permanent magnet has a cross-sectional shape long in the vertical direction;

the filling part comprises a bottom surface long in the vertical direction and flat in a direction perpendicular to the axis; and the rotor core comprises a gap continuous with both ends of the insertion hole in the vertical direction.

8. The permanent magnet embedded motor according to claim 1, wherein the rotor core comprises an isolation wall that separates the filling part from a wall surface that defines the short side of the insertion hole in the vicinity of both ends of the insertion hole in a direction of the long side.

9. The permanent magnet embedded motor according to claim 1, wherein the rotor core comprises a receiving part that contacts and receives the permanent magnet inserted into the insertion hole at the other opening end of the insertion hole.

10. The permanent magnet embedded motor according to claim 1, wherein the adhesive filled in the filling part is paste-like.

11. The permanent magnet embedded motor according to claim 1, further comprising:

a housing, fixing the stator and rotatably supporting the rotor.

12. A pump device, comprising:

a pump unit, suctioning and discharging a fluid;

a rotating shaft, connected to the pump unit; and a drive source, exerting a driving force on the rotating shaft, wherein the drive source is the permanent magnet embedded motor according to claim 11.

13. The pump device according to claim 12, wherein the pump unit is a trochoid pump comprising an inner rotor to which the rotating shaft is connected and an outer rotor engaged with the inner rotor.

* * * * *